United States Patent [19]
Nimishakvi et al.

[11] Patent Number: 5,809,341
[45] Date of Patent: Sep. 15, 1998

[54] CIRCUIT FOR TRANSMITTING RECEIVED CHARACTER WHEN DETECTION SIGNAL IS NOT ACTIVATED AND TRANSMITTING SUBSTITUTE CHARACTER WHEN THE DETECTION SIGNAL IS ACTIVATED

[76] Inventors: Hanumanthrao V. Nimishakvi, 3780 Warwick Rd, Fremont, Calif. 94555; Kameswaran Sivamani, 1055 Lily Ave., Sunnyvale, Calif. 94086

[21] Appl. No.: 672,641
[22] Filed: Jun. 28, 1996

Related U.S. Application Data

[63] Continuation-in-part of Ser. No. 625,661, Mar. 29, 1996.
[51] Int. Cl.$^6$ .................................................. G06F 15/02
[52] U.S. Cl. ........................................ 395/880; 371/47.1
[58] Field of Search ................................... 395/821, 822, 395/823, 881, 880; 371/47.1, 49.1, 49.2, 53

[56] References Cited

U.S. PATENT DOCUMENTS

| | | | |
|---|---|---|---|
| 5,125,089 | 6/1992 | McCambridge | 395/881 |
| 5,267,263 | 11/1993 | Feezel et al. | 375/220 |
| 5,268,934 | 12/1993 | Sharma et al. | 375/370 |
| 5,379,327 | 1/1995 | Sharma et al. | 375/377 |
| 5,640,433 | 6/1997 | Szczebak, Jr. et al. | 375/377 |
| 5,699,365 | 12/1997 | Klayman et al. | 371/5.5 |

*Primary Examiner*—Moustafa M. Meky
*Attorney, Agent, or Firm*—Majestic Parsons Siebert & Hsue; Frank D. Nguyen

[57] ABSTRACT

A data communication circuit of a computer system, includes transmitter and receiver circuits each having first and second data paths for respectively communicating synchronously and asynchronously formatted data on an alternatively selected basis, and a control circuit for controlling such communications. Included in the first data paths of the transmitter and receiver circuits are certain field check generating or error checking circuitry which are switchably coupled by their respective control circuits to their corresponding second data paths when synchronously formatted data is being asynchronously communicated through the second data paths. Included in the second data paths of the transmitter and receiver circuits are certain mapping logic to respectively accomodate the transmission and reception of Async-HDLC formatted data with transparency mapping.

23 Claims, 13 Drawing Sheets

CIRCUIT FOR TRANSMITTING RECEIVED CHARACTER WHEN DETECTION SIGNAL IS NOT ACTIVATED AND TRANSMITTING SUBSTITUTE CHARACTER WHEN THE DETECTION SIGNAL IS ACTIVATED

RELATED APPLICATIONS

This is a continuation-in-part application of application Ser. No. 08/625,661, filed Mar. 29, 1996, still pending.

FIELD OF THE INVENTION

This invention relates in general to computer systems and in particular, to data communication circuits of computer systems which communicate frames of asynchronous-HDLC/PPP data through an asynchronous data path configured with transparency mapping logic.

BACKGROUND OF THE INVENTION

A data communication circuit facilitates transfers of data between a computer system and one or more other computer systems or peripheral devices. To facilitate bidirectional communication, the data communication circuit generally includes separate transmitter and receiver circuits. To facilitate synchronous and asynchronous communication, the transmitter and receiver circuits may each include selectable data paths respectively configured for synchronous and asynchronous protocol communication.

Sometimes it is desirable to communicate synchronously formatted data through the asynchronous data path instead of through the synchronous data path of the transmitter or receiver circuit. In such a situation, the transmitting or receiving computer system must condition the data by performing certain functions in software, which are normally performed by hardware in the synchronous data path of the transmitter or receiver circuit. For examples, the transmitting computer system conventionally generates and appends check fields to the data when transmitting synchronously formatted data through the asynchronous data path of the transmitter circuit; and the receiving computer system conventionally performs error checking on the data when receiving synchronously formatted data from the asynchronous data path of the receiver circuit.

The software execution time to perform such functions is significant. Thus, the time required to communicate synchronously formatted data through the asynchronous data path is generally much longer than the time required to communicate such data through the synchronous data path. Also, while performing such data conditioning functions, a controlling processor of the transmitting or receiving computer system is kept from performing other important tasks. Further, additional memory resources are required for accomodating such conditioning functions, adding to system memory resource requirements.

In a particular application called "Async-HDLC", high-level data link control (HDLC) frame procedures are used with 8-bit Async characters individually formatted as one start bit, eight data bits, one stop bit, and no parity bit, wherein the HDLC bit-stuffing and bit oriented synchronization are replaced with Async start/stop bits, while the HDLC frame format including a field check sequence (FCS) field is maintained. Async-HDLC is frequently used with the Point to Point Protocol (PPP), and may be used with character mapping features employing two Async Control Character Maps (ACCMs) of 32 bits each.

To avoid confusion between control characters and other characters in a frame or packet, so-called "transparency" methods are generally employed. For Async-HDLC, transparency is achieved by a control-escape mechanism, wherein data or FCS characters resembling active control characters identified in the ACCMs are transmitted with bit 6 of the data or FCS character inverted, and preceeded by a control-escape character of hex 7D (binary 10111110) so that the receiving end can properly reconstruct and process the received data. For example, if the number hex 13 (binary 00010011) is assigned to an active control character in the transmitting ACCM, then the transmission of a data or FCS character which is also hex 13 is accomplished by transmitting a two character sequence consisting of the control-escape character, hex 7D (binary 01111110), followed by the character hex 33 (binary 00110011), which is the data or FCS character, hex 13, with its bit 6 inverted.

Conventionally, such mapping function is performed through software by the controlling processor of the transmitting computer system, and the required reconstruction of the data on the receiving side also performed through software by the controlling processor of the receiving computer system. Thus, performance of such control-escape mechanism functions also significantly add to the time that such processors are prevented from performing other important tasks. Further, additional memory resources may be required for accomodating such functions, adding to system memory resource requirements.

Accordingly, it is an object of the present invention to provide improved synchronous and asynchronous data path structures that cost effectively reduce the software execution time and memory resource requirements for selectively communicating synchronously formatted data through an asynchronous data path.

SUMMARY OF THE INVENTION

This and additional objects are accomplished by the various aspects of the present invention, wherein, briefly stated, one aspect is a data path circuit specially configured for transmitting Async-HDLC data with transparency mapping. Included in the data path circuit are means for receiving a character to be transmitted; means for activating a detection signal if the received character is an active one of a set of control characters; means for inverting a predetermined bit of the received character to generate a substitute character; and means for transmitting the received character if the detection signal is not activated, and transmitting the substitute character preceeded by a control-escape character if the detection signal is activated.

In another aspect, a method of transmitting Async-HDLC data with transparency mapping, comprises the steps of: receiving a character to be transmitted; activating a detection signal if the received character is an active one of a set of control characters; inverting a predetermined bit of the received character to generate a substitute character; and transmitting the received character if the detection signal is not activated, and transmitting the substitute character preceeded by a control-escape character if the detection signal is activated.

In still another aspect, a computer system comprises: a processor; and a data path circuit coupled to the processor through a data bus for transmitting Async-HDLC data with transparency mapping. Included in the data path circuit of the computer system are means for receiving a character to be transmitted; means for activating a detection signal if the received character is an active one of a set of control characters; means for inverting a predetermined bit of the received character to generate a substitute character; and means for transmitting the received character if the detection signal is not activated, and transmitting the substitute character preceeded by a control-escape character if the detection signal is activated.

Another aspect of the invention is a data path circuit for receiving Async-HDLC data with transparency mapping. Included in the data path circuit are means for receiving a character; means for activating a detection signal if the received character is an active control character; and means for including the received character in an incoming data stream and enabling a check circuit to include the received character in an error checking calculation if the detection signal is not activated, and for not including the received character in the incoming data stream and disabling the check circuit to not include the received character in the error checking calculation if the detection signal is activated.

In another aspect, a method of receiving Async-HDLC data with transparency mapping, comprises the steps of: receiving a character; activating a detection signal if the received character is an active control character; and including the received character in an incoming data stream and enabling a check circuit to include the received character in an error checking calculation if the detection signal is not activated, and not including the received character in the incoming data stream and disabling the check circuit to not include the received character in the error checking calculation if the detection signal is activated.

In yet another aspect, a computer system comprises: a processor; and a data path circuit coupled to the processor through a data bus for receiving Async-HDLC data with transparency mapping. Included in the data path circuit of the computer system are means for receiving a character; means for activating a detection signal if the received character is an active control character; and means for including the received character in an incoming data stream and enabling a check circuit to include the received character in an error checking calculation if the detection signal is not activated, and for not including the received character in the incoming data stream and disabling the check circuit to not include the received character in the error checking calculation if the detection signal is activated.

Additional objects, features and advantages of the various aspects of the present invention will be apparent from the following description of its preferred embodiments, which description should be taken in conjunction with the accompanying drawings.

DETAILED DESCRIPTION OF THE PREFERRED EMBODIMENTS

Figure 1:
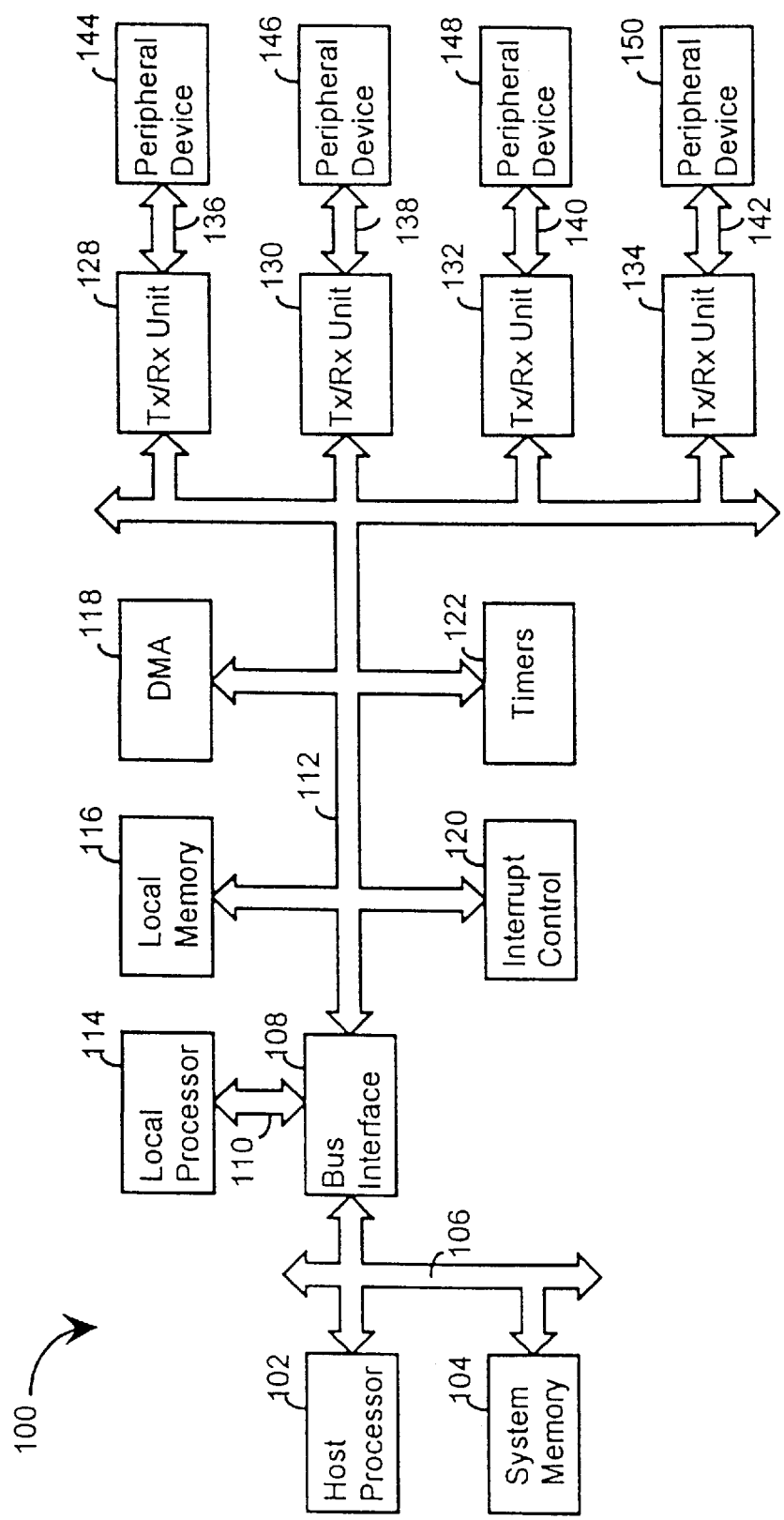
FIG. 1 illustrates, as an example, a block diagram of a computer system including one or more data communication circuits utilizing aspects of the present invention.

FIG. 1 illustrates, as an example, a block diagram of a computer system 100 including at one end, a processor 102 and a system memory 104 connected to a system bus 106 for communicating parallel transferred data, and at another end, peripheral devices 144–150 connected to corresponding serial communication channels 136–142 for communicating serially transferred data. The processor 102 may be any one of a number of commercially available processors such as those marketed by Intel Corp. or Motorola Inc. The system memory 104 may be any one or more of a number of solid state memory devices such as DRAMs, SRAMs, or EEPROMs. The peripheral devices may be any one of a number of serially communicating devices such as a printer, a modem, or another computer system communicating with the computer system 100 through, for example, a local area network (LAN).

A bus interface 108 facilitates the communication of parallel transferred data between the system bus 106, a local processor bus 110, and a local bus 112. A local processor 114 is connected to the local processor bus 110 for off-loading certain communication control tasks from the processor 102. A number of circuits such as, for examples, a local memory 116 for storing certain device status registers and/or data, a direct memory access (DMA) controller unit 118, an interrupt control unit 120, a timer unit 122, and a plurality of data communication circuits 128–134 are connected to the local bus 112. Except for the data communication circuits 128–134, each of these devices are generally of conventional design and function.

The bus interface 108 generally includes arbiter circuitry (not shown) in addition to interface circuitry (not shown) for communicating with the system bus 106, the local processor bus 110, and the local bus 112. The local processor 114 generally includes its own on-chip program ROM and data RAM to perform a number of tasks including programming data communication circuits 128–134 to transmit data with selected protocols, performing certain buffer management functions such as maintaining a data buffer pool in the system memory 104 or the local memory 116, setting up the DMA controller unit 118 to transfer data in either direction between the data buffer pool and the data communication circuits 128–134, and responding to certain interrupts such as those generated in response to the data buffer pool being full or empty. Additionally, the local processor 114 may also perform compression/decompression of outgoing/incoming data frames, and data encryption/decryption tasks. The local memory 116 generally includes a number of memory mapped registers such as device status registers for the system memory 104, the local memory 116, the DMA controller unit 118, the interrupt control unit 120, the timer unit 122, the data communication circuits 128–134, and the serial communication channels 136–142.

The data communication circuits 128–134 operate in conjunction with the DMA controller unit 118 and the local processor 114 to transmit data frames stored in the data buffer pool of the system memory 104 or the local memory 116 to the peripheral devices 144–150, and to receive data frames from the peripheral devices 144–150 and store them in the data buffer pool of the system memory 104 or the local memory 116. Each data communication circuit (e.g., 128) is dedicated to servicing a corresponding serial communication channel (e.g., 136), which in turn, may service one or more corresponding peripheral devices (e.g., 144).

Figure 4:
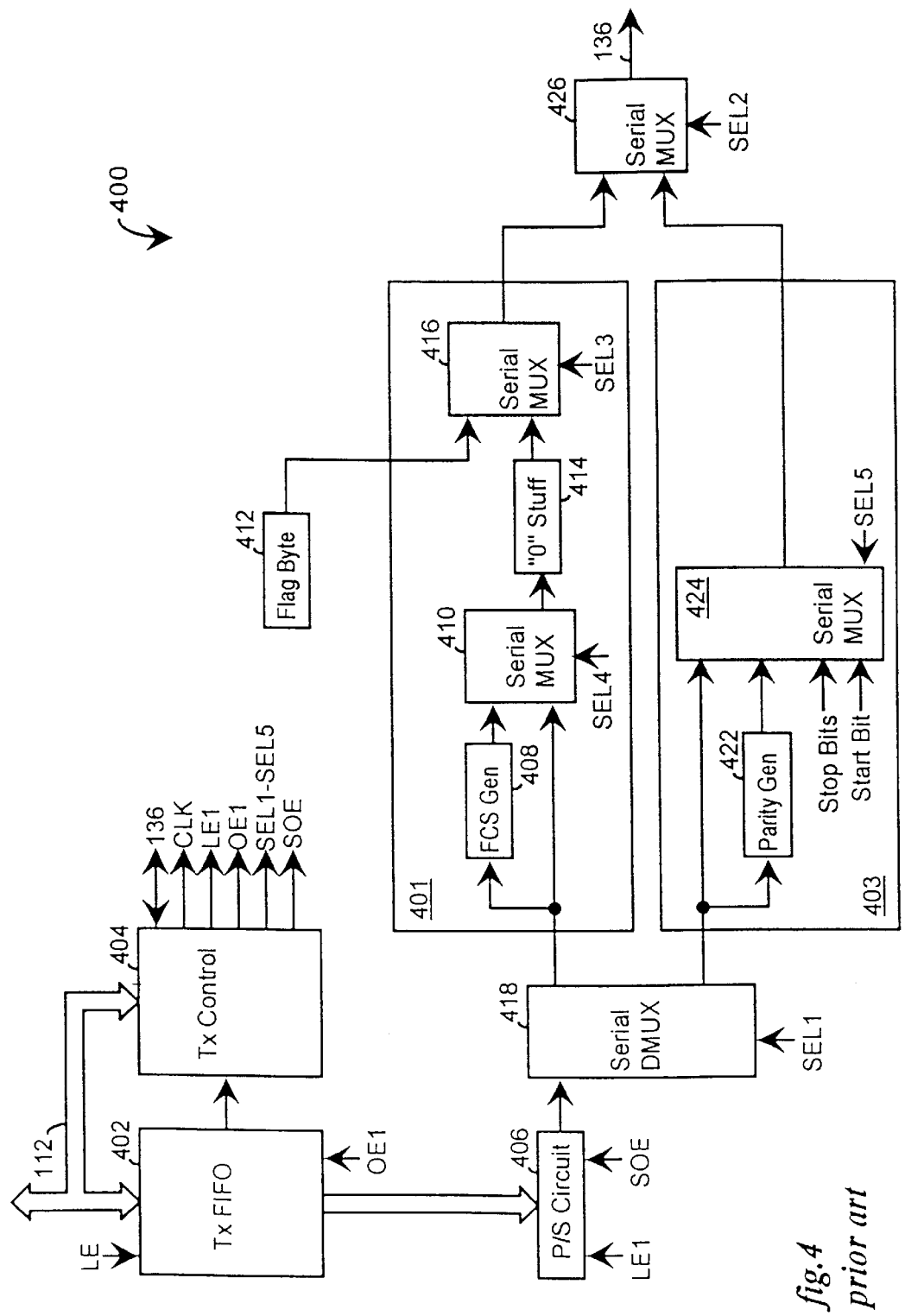
FIG. 4 illustrates, as an example, a block diagram of a prior art transmitter circuit including conventionally configured first and second data paths for respectively transmitting HDLC formatted frames of data and asynchronous mode formatted bytes of data.
Figure 5:
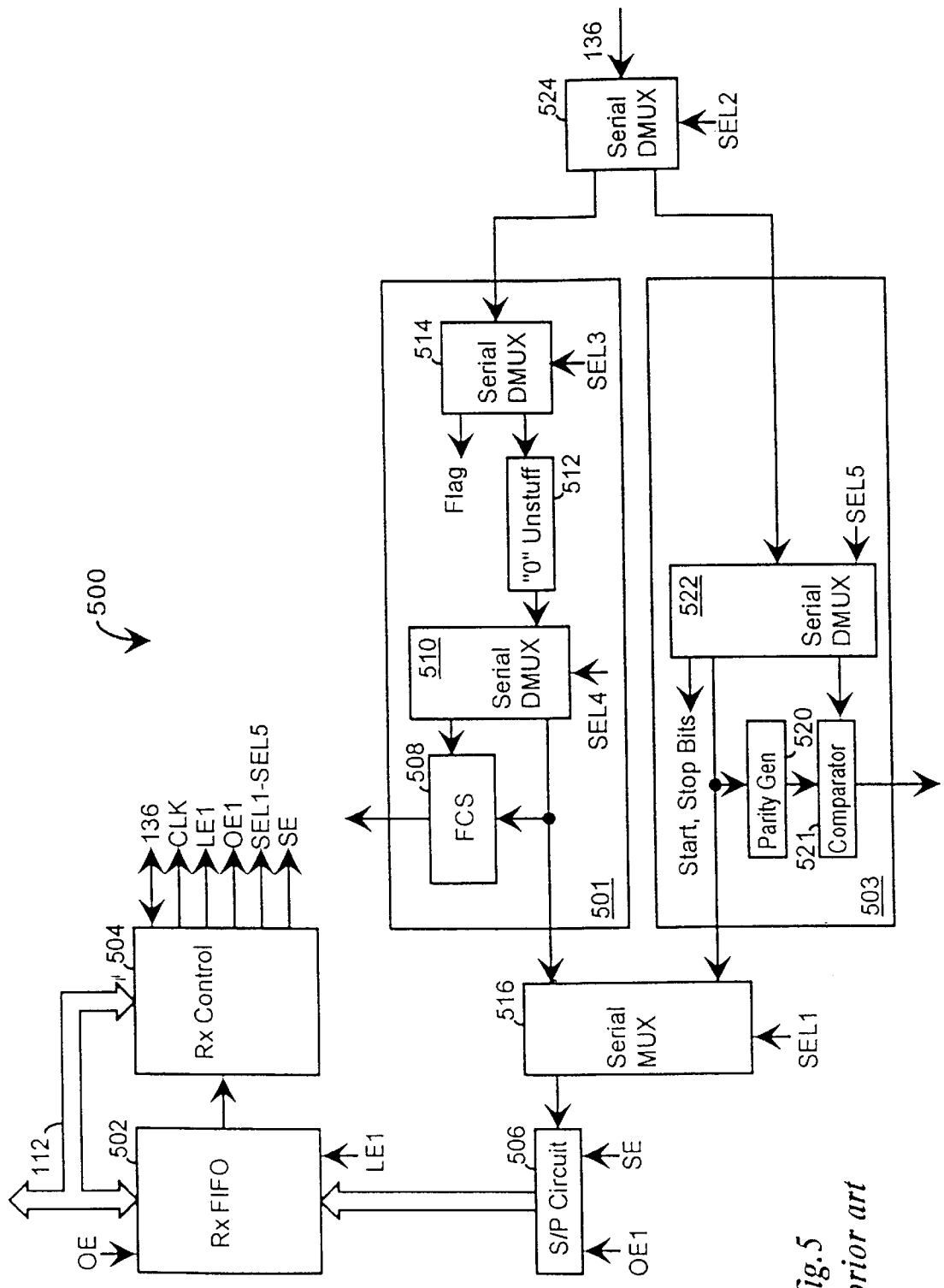
FIG. 5 illustrates, as an example, a block diagram of a prior art receiver circuit including conventionally configured first and second data paths for respectively receiving HDLC formatted frames of data and asynchronous mode formatted bytes of data.
Figure 6:
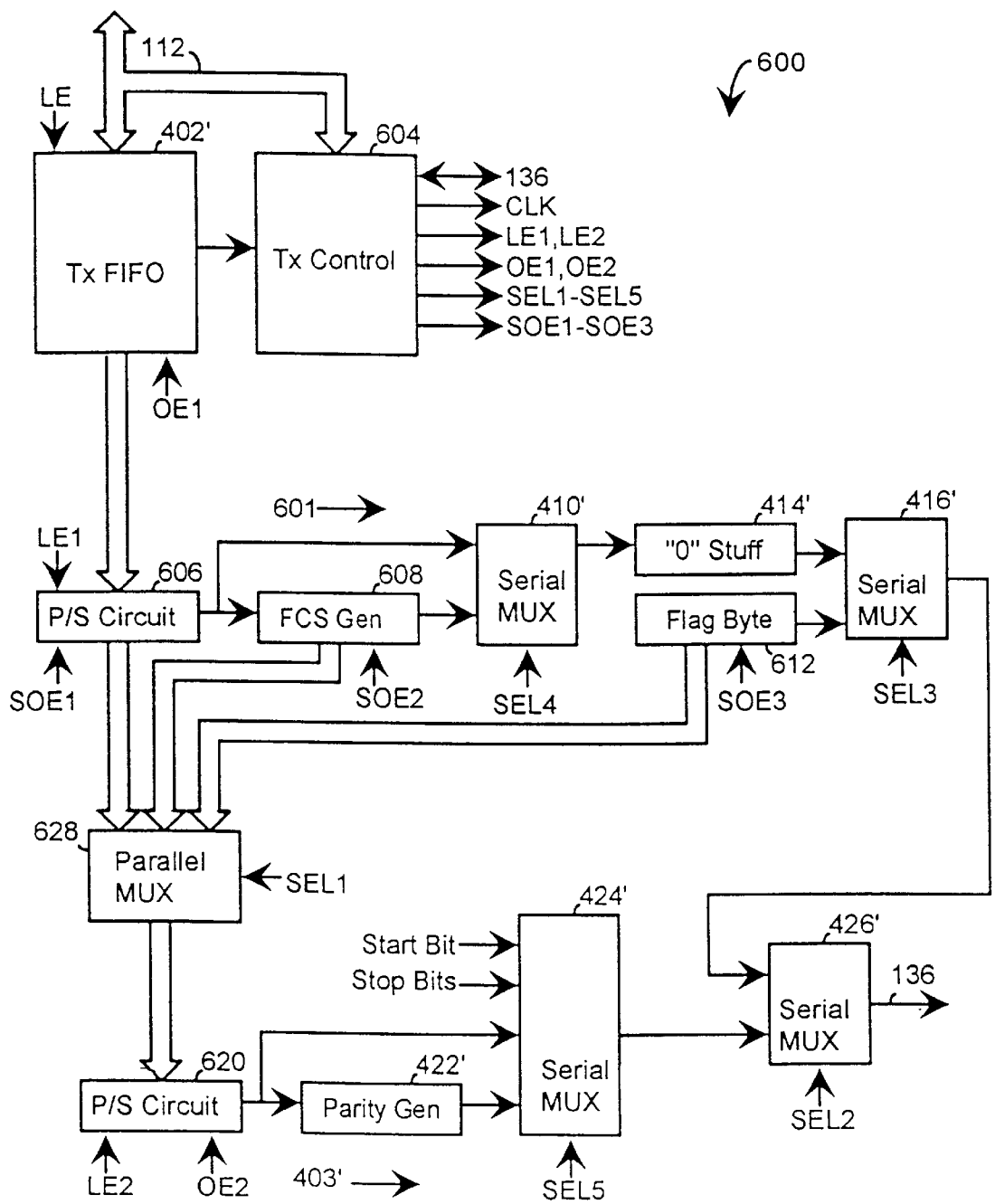
FIG. 6 illustrates, as an example, a block diagram of a transmitter circuit including first and second data paths utilizing aspects of the present invention for respectively transmitting HDLC formatted frames of data and asynchronous mode formatted bytes of data.
Figure 7:
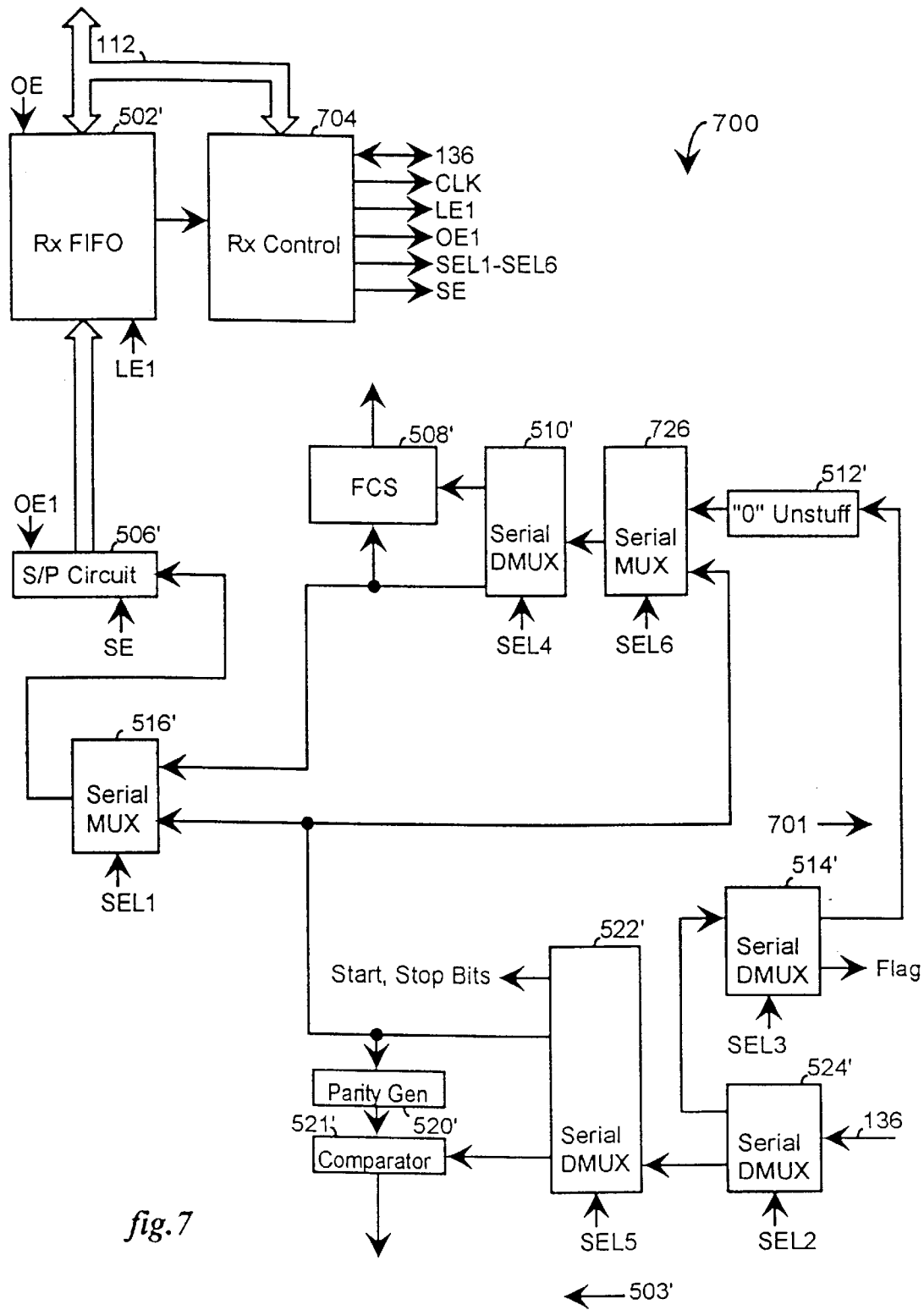
FIG. 7 illustrates, as an example, a block diagram of a receiver circuit including first and second data paths utilizing aspects of the present invention for respectively receiving HDLC formatted frames of data and asynchronous mode formatted bytes of data.

Included in each of the data communication circuits 128–134 are a transmitter circuit (e.g., 400 in FIG. 4 or 600 in FIG. 6) and a receiver circuit (e.g., 500 in FIG. 5 or 700 in FIG. 7). The transmitter circuit, when enabled, receives parallel transferred data from the data buffer pool in the system memory 104 or the local memory 116, converts the parallel received data into a stream of serial data of a selectable protocol, and writes the stream of serial data of the selectable protocol to another computer system or peripheral device coupled to the serial communication channel corresponding to the data communication circuit. The transmitter circuit may be enabled, for example, by either the processor 102 or the local processor 114. The receiver circuit, on the other hand, receives serially transferred data of a given protocol from another computer system or peripheral device connected to the serial communication channel corresponding to the data communication circuit, converts the serially received data of the given protocol into typically, byte-wide words of data, and transmits, when enabled, the words of data to the data buffer pool in the system memory 104 or the local memory 116. Since the data communication circuits 128–134 communicate on one side by parallel data transfers with the local bus 112, and communicate on another side by serial data transfers with corresponding serial communication channels, the transmit and receive circuits within the data communication circuits 128–134 respectively include parallel-to-serial and serial-to-parallel data conversion means.

In the preferred embodiment of the present invention, both the transmitter and receiver circuits communicate data in either a High-level Data Link Control (HDLC) protocol through a first data path, or an asynchronous protocol through a second data path. To facilitate transmission of an asynchronous-HDLC protocol through the second data path, certain error checking circuitry in the first data path are selectably shared with the second data path. It is readily apparent, however, that the teachings and full scope of the present invention are not to be limited to such protocols. In particular, the first data path may be any one or several synchronous protocols including character-oriented, byte-count-oriented, and bit-oriented protocols since each of such protocols employs a check field for checking the integrity of data transmission.

Figure 2:
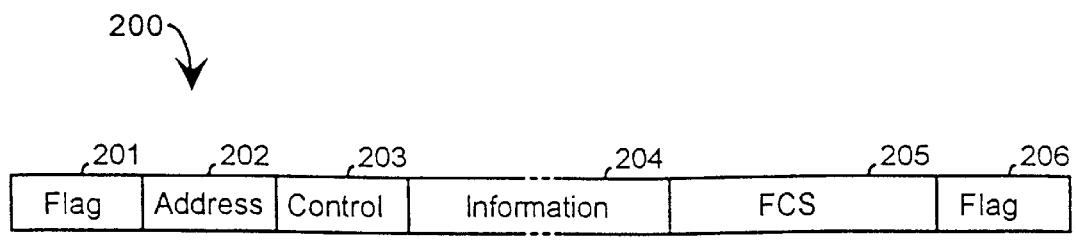
FIG. 2 illustrates, as an example, a frame of synchronously formatted data in the high-level data link control (HDLC) protocol format.

FIG. 2 illustrates, as an example, a frame of synchronously formatted (e.g., HDLC) data 200 including an information field 204 of variable length. Appended before the information field 204 are an opening or initial flag field 201, an address field 202, and a control field 203. The opening flag field 201 indicates the start of the data frame, the address field 202 indicates the address destination of the data frame, and the control field 203 indicates the type of frame being communicated among other things. Appended after the information field 204 are a frame check sequence (FCS) field 205, and a closing or trailing flag field 206. The FCS field 205 contains a value computed from the address, control and information fields which is useful for checking the integrity of a transmission of these fields, and the closing flag field 206 indicates the end of the data frame. Both opening and closing flag fields, 201 and 206, respectively, contain an eight-bit flag character, 01111110 (i.e., a zero, six ones, and another zero) which is generally not allowed to occur anywhere else in the frame by stuffing (i.e., inserting) an extra zero after each five consecutive ones in the address 202, control 203, information 204, and FCS 205 fields.

Figure 3:
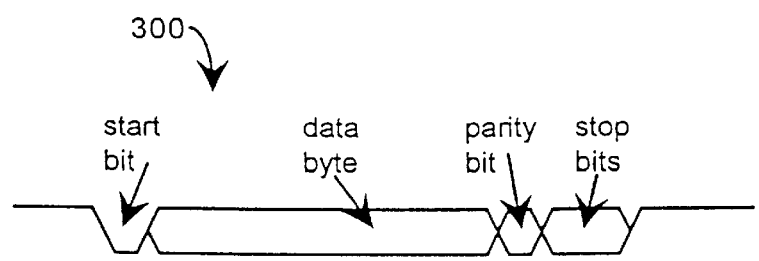
FIG. 3 illustrates, as an example, a byte of asynchronously formatted data in the asynchronous or start-stop protocol format.

FIG. 3 illustrates, as an example, a byte of asynchronously formatted data 300. In asynchronous or start-stop transmission mode, the line idle state is indicated by a voltage level on the line corresponding to the binary "one". A start bit corresponding to the binary "zero" indicates the start of transmission of a character, and one or more stop bits corresponding to the binary "one" indicate the end of transmission of a character. Although a byte of data is depicted as the typical length of a character being transmitted, in practice characters having lengths of 5 to 9 bits can be transmitted, as long as the receiving side knows beforehand the lengths of the characters to be received. As a rudimentary error control, a parity bit may also be calculated at the transmitting end, appended to the character being transmitted, and utilized at the receiving end in the conventional manner.

Asynchronous-HDLC formatted data is a hybrid version of the conventional HDLC formatted data of FIG. 2, and the asynchronously formatted data of FIG. 3. In asynchronous-HDLC formatted data, each byte, regardless of whether it is an opening flag byte, address byte, control byte, data byte, FCS byte, or closing flag byte is treated like any other asynchronous data byte by inserting a start bit before it, and following it with a parity bit and one or more stop bits. A distinguishing feature of asynchronous-HDLC formatted data is that unlike conventional HDLC formatted data, zero stuffing and unstuffing is not performed on the frame of asynchronous-HDLC formatted data.

FIG. 4 illustrates, as an example, a block diagram of a prior art transmitter circuit 400 including a transmitter (TX) control circuit 404; a first-in-first-out (FIFO) memory 402 or other buffering means for buffering data received from the data buffer pool in the system memory 104 or the local memory 116 via local bus 112; a byte-wide parallel-to-serial (P/S) converter circuit 406 for receiving data a byte at-a-time from the FIFO memory 402 under the control of the TX control circuit 404, and converting the received data into a stream of serial data; a serial demultiplexer (DMUX) circuit 418 for receiving the serial data from the P/S converter circuit 406, and passing the data to either a first or second output of the DMUX 418 depending upon the state of a select signal SEL1 provided by the TX control circuit 404; a first data path 401 for conditioning data received from the first output of the DMUX 418 into HDLC formatted frames of data; a second data path 403 for conditioning data received from the second output of the DMUX 418 into asynchronous formatted bytes of data; and a serial multiplexer (MUX) circuit 426 for receiving the conditioned outputs of the first and second data paths, 401 and 403, and selectively passing one or the other to the serial communication channel 136, depending upon the state of a select signal SEL2 provided by the TX control circuit 404.

To form a frame of HDLC formatted data, the first data path 401 includes hardware for appending an opening flag field before each frame of data being transmitted, calculating a frame check sequence (FCS) value for each frame of data being transmitted, stuffing zeroes as appropriate into each frame of data being transmitted, appending such calculated FCS value in a FCS field after the frame of data, and appending a closing flag field after the FCS field for each frame of data being transmitted. To form a byte of asynchronously formatted data, the second data path includes hardware for appending a start bit before each byte of data being transmitted, calculating a parity bit for each byte of data being transmitted, appending the calculated parity bit after the byte of data, and appending one or more stop bits after the parity bit for each byte of data being transmitted.

If a frame of HDLC formatted data is to be transmitted through the first data path 401, the address field (e.g., 202), the control field (e.g., 203), and the information fields (e.g., 204) of the frame of data are stored in the FIFO memory 402 under the cooperative control of the DMA controller unit 118 and the TX control circuit 404. On the other hand, if a frame of asynchronous-HDLC formatted data is to be transmitted through the second data path 403, the opening flag field (e.g., 201), the address field (e.g., 202), the control field (e.g., 203), the information fields (e.g., 204), a FCS field (e.g., 205), and a closing flag field (e.g., 206) are stored in the FIFO memory 402 under the cooperative control of the DMA controller unit 118 and the TX control circuit 404. The P/S converter circuit 406 sequentially receives data a byte-at-a-time from the FIFO memory 402, and provides a serial stream of the received data to the serial DMUX 418 which in turn, passes in response to its select signal SEL1 being in a first logic state, the received serial stream of data to the first data path 401, and in response to its select signal SEL1 being in a second logic state, the received serial stream of data to the second data path 403. Appropriate control signals for performing such functions are generated by the TX control circuit 404, and provided to the P/S converter circuit 406 and serial DMUX 418.

Included in the first data path 401 are a FCS generator circuit 408, a first serial MUX 410, a zero stuffing circuit 414, and a second serial MUX 416. The second serial MUX 416 has a first input connected to a register 412 containing a flag byte (i.e., 01111110), and a second input connected to an output of the zero stuffing circuit 414. The second serial MUX 416 generates a HDLC formatted frame of data at its output by appending opening and closing flag fields before each frame of data being transmitted in response to a select signal SEL3 provided by the TX control circuit 404. In particular, the select signal SEL3 is in a first logic state when the opening flag field is being passed by the second serial MUX 416, the select signal SEL3 is in a second logic state when the frame of data is being passed by the second serial MUX 416, and the select signal SEL3 is back in the first logic state when the closing flag field is being passed by the second serial MUX 416. The FCS generator circuit 408 calculates an FCS value for each frame of data being transmitted, and the first serial MUX 410 appends the FCS value generated by the FCS generator circuit 408 after each frame of data being transmitted in response to a select signal SEL4 provided by the TX control circuit 404. In doing so, the select signal SEL4 is in a first logic state when the frame of data is being passed by the first serial MUX 410, and the select signal SEL4 is in a second logic state when the FCS value is being passed by the first serial MUX 410.

Included in the second data path 403 is a parity generator circuit 422, and a serial MUX 424. The parity generator circuit 422 calculates a parity bit for each byte of data being transmitted, and the serial MUX 424 appends the parity bit generated by the parity generator circuit 422, a start bit, and one or more stop bits to each byte of data being transmitted in response to one or more select signals SEL5 provided by the TX control circuit 404. In order to generate an asynchronously formatted byte of data such as depicted in FIG. 3, the select signal SEL5 is in a first logic state when the start bit is being passed by the serial MUX 424, in a second logic state when a byte of data received from the serial DMUX 418 is being passed by the serial MUX 424, in a third logic state when the parity bit generated by the parity generator circuit 422 is being passed by the serial MUX 424, and in a fourth logic state when the one or more stop bits are being passed by the serial MUX 424.

FIG. 5 illustrates, as an example, a block diagram of a prior art receiver circuit 500 including a receiver (RX) control circuit 504; a FIFO memory 502 or other buffer means for buffering data to be transmitted to the data buffer pool in the system memory 104 or the local memory 116 via local bus 112; a byte-wide serial-to-parallel (S/P) converter circuit 506 for receiving serial data and transferring the received data a byte-at-a-time to the FIFO memory 502 under the control the RX control circuit 504; a serial DMUX 524 for receiving data from the serial communication channel 136, and selectively passing the data to a first or second output of the serial DMUX 524; a first data path 501 for conditioning HDLC formatted data received from the first output of the serial DMUX 524; a second data path for conditioning asynchronously formatted data received from the second output of the serial DMUX 524; and a serial MUX 516 for selectively passing either data received from the first data path 501 or data received from the second data path 503 to the S/P converter circuit 506, depending upon the state of a select signal SEL1 provided by the RX control circuit 504.

To condition a frame of HDLC formatted data, the first data path 501 includes hardware for stripping the opening flag field before each frame of data being received, unstuffing zeroes as appropriate from each frame of data being received, performing an FCS check to ensure integrity of the data transmission, generating a check signal indicative of such FCS check, stripping the appended FCS field after each frame of data being received, and stripping the closing flag field after each frame of data being received. To condition a byte of asynchronously formatted data, the second data path 503 includes hardware for stripping the start bit before each byte of data being received, calculating a parity bit for each byte of data being received, comparing the thus calculated parity bit against the parity bit appended after the byte of data, generating a parity check signal indicative of such parity bit check, stripping the appended parity bit after the byte of data, and stripping the one or more stop bits after each byte of data being received.

If a frame of HDLC formatted data is to be conditioned by the first data path 501, the serial DMUX 524 passes the frame of data to the first data path 501 in response to a select signal SEL2 provided by the RX control circuit 504 being in a first logic state. On the other hand, if a frame of asynchronous-HDLC formatted data is to be received through the second data path 503, the serial DMUX 524 passes the frame of data to the second data path 503 in response to the select signal SEL2 being in a second logic state. The RX control circuit 504 communicates with the transmitting computer system in a conventional manner to determine beforehand which protocol mode is to be received.

Included in the first data path 501 are a FCS check circuit 508, a first serial DMUX 510, a zero unstuffing circuit 512, and a second serial DMUX 514. The second serial DMUX 514 strips off the flag field from the HDLC formatted data, and passes the remainder to the zero unstuffing circuit 512 in response to a select signal SEL3 provided by the RX control circuit 504. In particular, the second serial DMUX 514 passes the opening and closing flag fields to a first unconnected output when the select signal SEL3 is in a first logic state, and passes the address (e.g., 202), control (e.g., 203), information (e.g., 204), and FCS fields (e.g., 205) to the zero unstuffing circuit 512 when the select signal SEL3 is in a second logic state. The first serial DMUX 510 thereupon receives the output of the zero unstuffing circuit 512, and passes the address (e.g., 202), control (e.g., 203), and information (e.g., 204) fields to a first input of the serial MUX 516 and a first input of the FCS check circuit 508 in response to a select signal SEL4 provided by the RX control circuit 504 being in a first logic state, and passes the FCS field (e.g., 205) to a second input of the FCS check circuit 508 in response to the select signal SEL4 being in a second logic state. The FCS check circuit 508 calculates a FCS value from the address (e.g., 202), control (e.g., 203), information (e.g., 204), and FCS (e.g., 205) fields provided to its first and second inputs, compares the calculated FCS value against a predetermined fixed value to check the integrity of the data transmission, and generates a FCS check signal indicative of the comparison which may set a bit in a appropriate status register (not shown).

Included in the second data path 503 is a parity generator circuit 520, a comparator 521, and a serial DMUX 522. The parity generating circuit 520 calculates a parity bit for each byte of data being received, the comparator 521 compares the calculated parity bit against a parity bit appended to the byte, and the serial DMUX 522 strips the parity bit, a start bit, and one or more stop bits from each byte of data being received in response to one or more select signals SEL5 provided by the RX control circuit 504. In particular, the serial DMUX 522 passes the start and stop bits to a first unconnected output when the select signal SEL5 is in a first logic state, passes the byte of data to a second output of the serial DMUX 522 connected to a second input of the serial MUX 516 and an input of the parity generator circuit 520 when the select signal SEL5 is in a second logic state, and passes the parity bit to a third output of the serial DMUX 522 connected to a first input of the comparator 521 when the select signal SEL5 is in a third logic state. The comparator 521 then compares the calculated parity bit received at a second input from the parity generator circuit 520, against the corresponding parity bit received at its first input from the serial DMUX 522, and generates a parity check signal indicative of such comparison.

FIG. 6 illustrates, as an example, a block diagram of a transmitter circuit 600 utilizing aspects of the present invention for transmitting HDLC formatted frames of data selectively through either a first data path 601 configured for transmitting HDLC formatted frames of data, or a second data path 403' configured for transmitting asynchronous mode formatted bytes of data through the serial communication channel 136. The transmitter circuit 600 results from certain advantageous modifications to the prior art transmitter circuit 400. To simplify the description, identical reference numbers with primes are used to indicate identically functioning parts in the transmitter circuits 600 and 400, so that repetitive descriptions of these parts are unnecessary. For example, the FIFO memory 402', the serial MUX 426', and the second data path 403' of the transmitter circuit 600 function as their unprimed counterparts in the prior art transmitter circuit 400; and serial MUX 410', zero stuffing circuit 414', and serial MUX 416' of the first data path 601 of the transmitter circuit 600 function as their unprimed counterparts in the first data path 401 of the prior art transmitter circuit 400.

Modifications to the prior art transmitter circuit 400 resulting in the improved transmitter circuit 600 include elimination of the serial DMUX 418; changing the output architectures of the P/S circuit 406, FCS generator circuit 408, and flag byte register 412 to include parallel output and serial enable functions as in P/S circuit 606, FCS generator circuit 608, and flag byte register 612; and adding a parallel MUX 628 and a P/S converter circuit 620. A modified version of the TX control circuit 404 is also included as TX control circuit 604 to generate appropriate control signals for the transmitter circuit 600.

The serial DMUX 418 has been eliminated so that the FCS generator circuit 608 receives the address, control and information fields for each frame of data regardless of whether the data is being transmitted through the first data path 601 or the second data path 403'. Since the FCS generator circuit 608 calculates an FCS value for each frame of data from its address, control and information fields and provides it in a FCS field to the second data path 403', this frees up the processor (e.g., 102 or 114) of the transmitting computer system (e.g., 100) from having to do so when asynchronous-HDLC formatted data are being transmitted through the asynchronous data path 403'. Further, since the flag byte register 612 also provides opening and closing flag fields to the second data path 403', this also frees up the processor of the transmitting computer system from having to do so. Accordingly, the processor of the transmitting computer system only needs to provide the address, control and information fields for each frame of asynchronous-HDLC formatted data. Since the FIFO memory 402' does not have to store the opening and closing flag bytes, or the FCS field, memory requirements for transmitting a frame of asynchronous-HDLC formatted data is also less for the transmitter circuit 600 than it is for the prior art transmitter circuit 400.

If a frame of asynchronous-HDLC formatted data is to be transmitted through the second data path 403' of the transmitter circuit 600, the address field (e.g., 200), the control field (e.g., 203), and the information fields (e.g., 204) of the frame of data are stored in the FIFO memory 402' under the cooperative control of the DMA controller unit 118 and the TX control circuit 604. To initiate the transmission of a frame of data through the second data path 403', the contents (i.e., 01111110) of the flag byte register 612 are provided through the parallel output of the flag byte register 612 to a third input of the parallel MUX 628, which passes the flag field to a P/S circuit 620 in response to a select signal (or signals) SEL1 provided by the TX control circuit 604 being in a third logic state. The output enable OE2 of the P/S circuit 620 is thereupon activated by the TX control circuit 604, so that an opening flag field is serially provided to the second data path 403'. The second data path 403' thereupon transmits the opening flag field by inserting a start bit before it, calculating a parity bit and appending the calculated parity bit after it, then appending one or more stop bits after the appended parity bit in the same manner as described for the second data path 403 of the conventional transmitter circuit 400.

The address field is then read out of the FIFO memory 402' and latched into the P/S circuit 606 under the control of the TX control circuit 604. The address field is then made available through the parallel output of the P/S circuit 606 to a first input of the parallel MUX 628, which passes the control field to the P/S circuit 620 in response to the select signal SEL1 provided by the TX control circuit 604 being in a first logic state. The address field is thereupon latched into the P/S circuit 620 by the TX control circuit activating its latch enable LE2. The serial output enable SOE1 of the P/S circuit 606, and the output enable OE2 of the P/S circuit 620 are thereupon both activated, for example, so that the address field is serially provided to both the FCS generator circuit 608 and the second data path 403'. The second data path 403' thereupon transmits the address field in the same manner as described in reference to the opening flag field.

After serially outputting the address field from the P/S circuits 606 and 620, the control field is next read out of the FIFO memory 402 and latched into the P/S circuit 606 under the control of the TX control circuit 604. The control field is then provided through the parallel output of the P/S circuit 606 to the first input of the parallel MUX 628, which passes the control field to the P/S circuit 620 in response to the select signal SEL1 provided by the TX control circuit 604 still being in the first logic state. The control field is thereupon latched into the P/S circuit 620 by the TX control circuit activating its latch enable LE2. The serial output enable SOE1 of the P/S circuit 606, and the output enable OE2 of the P/S circuit 620 are thereupon both activated, for example, so that the control field is serially provided to both the FCS generator circuit 608 and the second data path 403'. The second data path 403' thereupon transmits the control field in the same manner as described in reference to the opening flag field.

After serially outputting the control field from the P/S circuits 606 and 620, the information fields are sequentially read out of the FIFO memory 402 and latched into the P/S circuit 606 under the control of the TX control circuit 604. The information fields are sequentially provided through the parallel output of the P/S circuit 606 to the first input of the parallel MUX 628, which in turn, sequentially passes the information fields to the P/S circuit 620 in response to the select signal SEL1 provided by the TX control circuit 604 remaining in the first logic state. The information fields are thereupon sequentially latched into the P/S circuit 620 by the TX control circuit activating its latch enable LE2. The serial output enable SOE1 of the P/S circuit 606, and the output enable OE2 of the P/S circuit 620 are sequentially activated, for example, so that the information fields are serially provided a byte-at-a-time to both the FCS generator circuit 608 and the second data path 403'. The second data path 403' thereupon sequentially transmits each of the information fields in the same manner as described in reference to the opening flag field.

After sequentially outputting the information fields through the P/S circuits 606 and 620, a FCS field is provided through a parallel output of the FCS generator circuit 608 to a second input of the parallel MUX 628, which passes the FCS field to the P/S circuit 620 in response to the select signal SEL1 provided by the TX control circuit 604 being in a second logic state. The FCS field is then latched in the P/S circuit 620, and serially provided to the second data path 403' by the output enable OE2 being activated by the TX control circuit 604. The second data path 403' thereupon transmits the FCS field in the same manner as described in reference to the opening flag field.

To finish the transmission of the frame of data through the second data path 403', the contents (i.e., 01111110) of the flag byte register 612 are again provided through the parallel output of the flag byte register 612 to the third input of the parallel MUX 628, which passes the flag field to the P/S circuit 620 in response to the select signal SEL1 provided by the TX control circuit 604 being in the third logic state. The output enable OE2 of the P/S circuit 620 is thereupon activated by the TX control circuit 604, so that a closing flag field is serially provided to the second data path 403'. The second data path 403' thereupon transmits the closing flag field in the same manner as described in reference to the opening flag field.

If a frame of HDLC formatted data is to be communicated through the first data path 601, timing of the activations of the serial output enables, SOE1, SOE2 and SOE3, respectively of the P/S circuit 606, the FCS generator circuit 608, and the flag byte register 612 is straightforward. Except for the timing of these serial output enables, operation of the first data path 601 is similar to that described in reference to the first data path 401 of the prior art transmitter circuit 400.

FIG. 7 illustrates, as an example, a block diagram of a receiver circuit 700 including first and second data paths, 701 and 503', for respectively receiving HDLC formatted frames of data (e.g., 200) and asynchronous mode formatted bytes of data (e.g., 300). As with the transmitter circuit 600, the receiver circuit 700 results from certain advantageous modifications to the prior art receiver circuit 500. To simplify the description, identical reference numbers with primes are used to indicate identically functioning parts in the receiver circuits 700 and 500, so that repetitive descriptions of these parts are unnecessary. For example, the FIFO memory 502', the S/P circuit 506', the serial MUX 516', the serial DMUX 524, and the second data path 503' of the receiver circuit 700 function as their identically referenced counterparts in the prior art receiver circuit 500, and the serial DMUX 514', the zero unstuffing circuit 512', the serial DMUX 510', and the FCS check circuit 508' of the first data path 701 of the receiver circuit 700 function as their identically referenced counterparts in the first data path 501 of the prior art receiver circuit 500.

The primary modification to the prior art receiver circuit 500 resulting in the improved receiver circuit 700 is the insertion of a serial MUX 726 between the output of the zero unstuffing circuit 512' and the input to the serial DMUX 510'. In particular, the output of the zero unstuffing circuit 512' is connected to a first input of the serial MUX 726, and the output of the second data path 503' is connected to a second input of the serial MUX 726. When data are being communicated through the first data path 701, a select input SEL6 of the serial MUX 726 is placed in a first logic state by a RX control circuit 704 of the receiver circuit 700 so as to pass the output of the zero unstuffing circuit 512' to the input of the serial DMUX 510'. The first data path 701 of the receiver circuit 700 thereupon functions identically as the first data path 501 of the prior art receiver circuit 500. On the other hand, when address, control, information and FCS data are being communicated through the second data path 503', the select input SEL6 of the serial MUX 726 is placed in a second logic state by the RX control circuit 704 so as to pass the output of the second data path 503' to the input of the serial DMUX 510'. When the opening and closing flags are being communicated through the second data path 503', the select input SEL6 of the serial MUX 726 is placed in the first logic state by the RX control circuit 704 so as not to pass the flag byte output of the second data path 503' to the input of the serial DMUX 510'. A modified version of the RX control circuit 504 is also included in the receiver circuit 700 to generate appropriate control signals for the receiver circuit 700.

The serial MUX 726 has been added so that the field check circuit 508' of the first data path 701 can be shared with the second data path 503'. This frees up the processor (e.g., 102 or 114) of the receiving computer system (e.g., 100) from having to perform such field check functions, such as required in utilizing the prior art receiver circuit 500.

When receiving a frame of HDLC formatted data through the second data path 503', the second data path 503' first conditions the received bytes of data as described in reference to its counterpart 503 in the prior art receiver circuit 500. The conditioned opening flag field is passed through the serial MUX 516' to the S/P circuit 506' by its select signal SEL1 being placed in a second logic state by the RX control circuit 704, and is not passed through the serial MUX 726 to the serial DMUX 510' by its select signal SEL6 being placed in the first logic state by the RX control circuit 704. The opening flag field is then stored in the FIFO memory 502' in the conventional manner under the control of the RX control circuit 704. The conditioned address, control, information and FCS fields are then passed a-byte-at-a-time through both the serial MUX 516' to the S/P circuit 506' and through the serial MUX 726 to the serial DMUX 510' by their respective select signals SEL1 and SEL6 being placed in their second logic states by the RX control circuit 704. The serial DMUX 510' and the FCS check circuit 508' then performs error checking in the same manner as described in reference to unprimed counterparts in FIG. 5, while the address, control, information, and FCS fields are stored in the FIFO memory 502' from the second data path 503' through the serial MUX 516' and the S/P circuit 506' under the control of the RX control circuit 704 in the same manner as described in reference to their unprimed counterparts in FIG. 5. Finally, the conditioned closing flag field is passed through the serial MUX 516' to the S/P circuit 506' by its select signal SEL1 being placed in the second logic state by the RX control circuit 704, and is not passed through the serial MUX 726 to the serial DMUX 510' by its select signal SEL6 being placed back in the first logic state by the RX control circuit 704. The closing flag field is then stored in the FIFO memory 502' in the conventional manner under the control of the RX control circuit 704.

Figure 8:
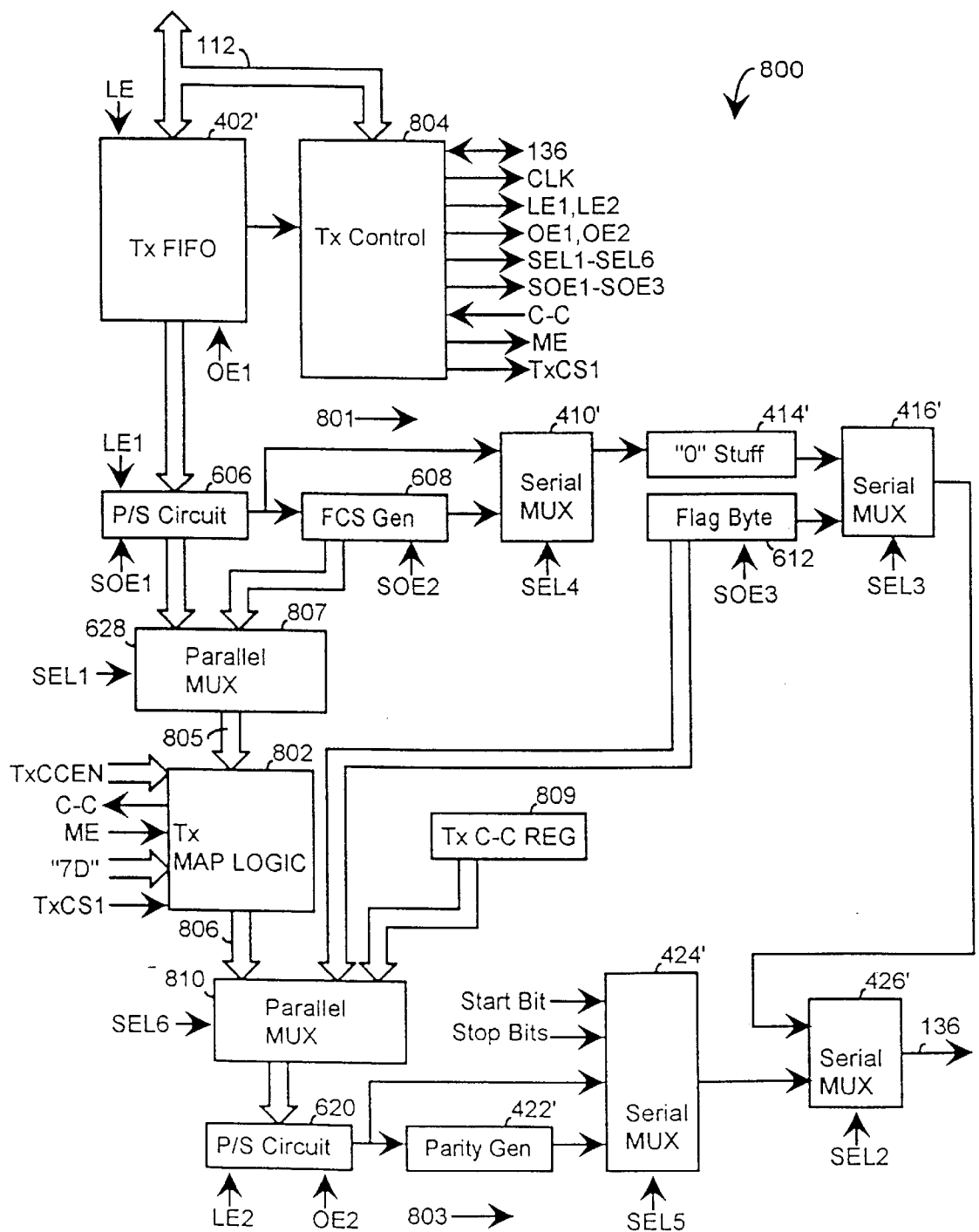
FIG. 8 illustrates, as an example, a block diagram of a transmitter circuit including an asynchronous data path configured with transparency mapping logic suitable for transmitting data in Async-HDLC, utilizing aspects of the present invention.

FIG. 8 illustrates, as an example, a block diagram of an alternative transmitter circuit 800 including an asynchronous data path 803 configured with mapping logic 802 suitable for transmitting data in Async-HDLC with transparency mapping. Like the transmitter circuit 600 of FIG. 6, the transmitter circuit 800 can also transmit HDLC formatted frames of data selectively through either a first data path 801 configured for transmitting HDLC formatted frames of data, or a second data path 803 configured for transmitting Async-HDLC formatted bytes of data through the serial communication channel 136. Therefore, since many of the components of the two transmitter circuits, 800 and 600, are identical in construction and function, to simplify the following discussion, identical reference numbers are used in the figures to indicate identically functioning components.

A significant difference between the transmitter circuits 800 and 600 is that the transmitter circuit 800 performs transparency mapping primarily through hardware configured into its asynchronous data path 803, whereas the transmitter circuit 600 requires that such transparency mapping be performed primarily through software by a controlling processor. Accordingly, the transmitter circuit 800 is useful in that it frees up its respective controlling processor from having to perform such transparency mapping function and therefore, allows more time for its processor to perform other important tasks.

To transmit data in Async-HDLC with transparency mapping, the transmitter circuit 800 includes transmitter (Tx) mapping logic 802, which receives data (i.e., address, control, and information fields) and FCS (i.e., FCS fields) characters to be transmitted from a parallel MUX circuit 807, which in turn, receives the data characters from the FIFO memory 402' through the P/S circuit 606 and the FCS characters corresponding to the data characters from the FCS generator circuit 608. Since the Tx mapping logic 802 treats both the data and FCS characters in the same fashion, both are simply referred to herein for convenience, as "characters". The order in which the data and FCS characters are received by the Tx mapping logic 802 is the same as described in reference to the parallel MUX circuit 628 of FIG. 6. The Tx mapping logic 802 is enabled through a map enable signal ME provided, for example, by the TX control circuit 804 or the local processor 114 of the transmitting computer system 100. Active ones of a set of control characters to be mapped are indicated by a plurality of control character enable signals TxCCEN deriving from, for example, a transmitter (Tx) ACCM register. After processing each received character, the Tx mapping logic 802 provides its output to a first set of inputs of a parallel MUX circuit 810, which is also provided at respective second and third sets of inputs, a flag byte, hex 7E, from the flag byte register 612, and a control character from a transmitter (Tx) control character (C—C) register 809. The parallel MUX circuit 810 passes a character provided at any one of its first, second or third sets of inputs to its output, as determined by input select signals SEL6 provided, for example, by the TX control circuit 804 or the local processor 114 of the transmitting computer system 100, to a parallel-to-serial (P/S) circuit 620 which serially passes each parallel received character to the remainder of the asynchronous data path 803 to be transmitted in the Async-HDLC with transparency mapping format through the serial communication channel 136.

In the preferred embodiment, the set of control characters to be mapped includes thirty-two (32) common control characters such as ACK (Acknowledge), DLE (Data link escape), ENQ (Enquiry), EOT (End of transmission), ETB (End of transmission block), ETX (End of text), NAK (Negative Acknowledge), SOH (Start of heading), STX (Start of text), and SYN (Synchronous idle). Table I illustrates an example of one set of 32 control characters ranging from hex 00 to hex 1F.

TABLE I

| Byte (hex) | Control Character | Byte (hex) | Control Character | Byte (hex) | Control Character |
|---|---|---|---|---|---|
| 00 | NUL | 0B | VT | 16 | SYN |
| 01 | SOH | 0C | FF | 17 | ETB |
| 02 | STX | 0D | CR | 18 | CAN |
| 03 | ETX | 0E | SO | 19 | EM |
| 04 | EOT | 0F | SI | 1A | SUB |
| 05 | ENQ | 10 | DLE | 1B | ESC |
| 06 | ACK | 11 | DC1 | 1C | FS |
| 07 | BEL | 12 | DC2 | 1D | GS |
| 08 | BS | 13 | DC3 | 1E | RS |
| 09 | HT | 14 | DC4 | 1F | US |
| 0A | LF | 15 | NAK | | |

In addition to the thirty-two (32) common control characters, an additional four (4) characters beyond the hex 00 to 1F range may be user defined in the preferred embodiment. Although the selection of such characters is generally open, care should be taken in their definition to ensure that inverting their sixth bit will not result in another control character. Each of the 32 common and 4 user-defined control characters may be either active or inactive. The active/inactive status of each of the 32 common control characters is stored in respective bits of the 32-bit Tx ACCM register, and the active/inactive status of each of the 4 user-defined characters is stored in respective bits of a 4-bit special map (TSPMAP) register, wherein both the Tx ACCM register and the TSPMAP register are preferably included in the Tx control circuit 804 (or alternatively, in the local processor 114 or local memory 116 of the transmitting computer system 100).

Figure 9:
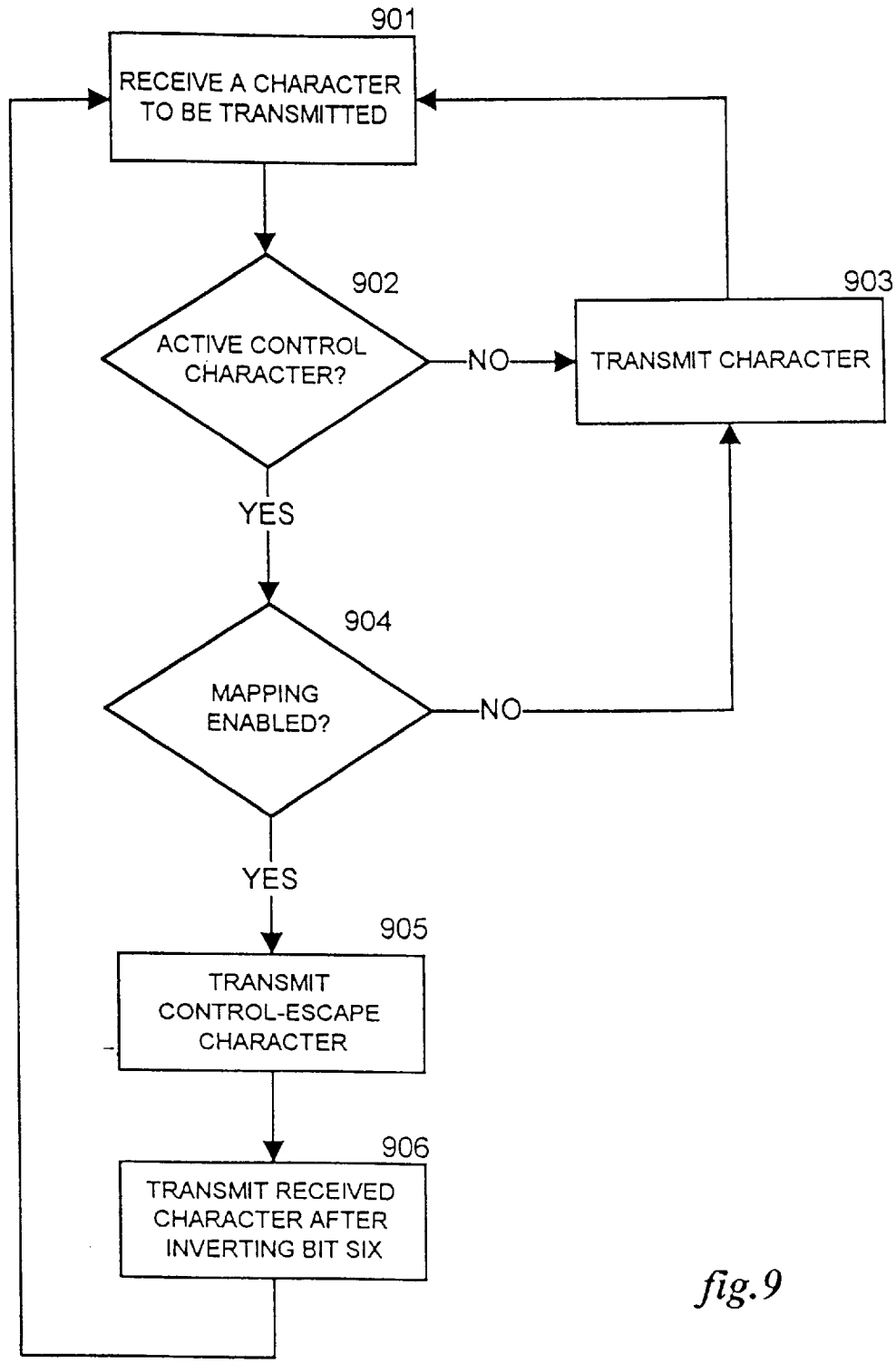
FIG. 9 illustrates, as an example, a flow diagram including certain steps of a method of transmitting data in Async-HDLC using transparency mapping, utilizing aspects of the present invention.

FIG. 9 illustrates, as an example, a flow diagram including certain steps of a method of transmitting data in Async-HDLC using transparency mapping, as performed by the Tx mapping logic 802. In a first step 901, the Tx mapping logic 802 receives a character to be transmitted from the parallel MUX circuit 807. In a second step 902, the Tx mapping logic 802 determines whether or not the received character is an active control character, wherein the term "control character" is understood here and in the following, to include all mapped characters including the 32 common control characters, the 4 user-defined characters, and any other control characters which are always active. If the received character is not an active control character (i.e., it is either not one of the mapped characters, or is an inactive one of the mapped characters), then in a third step 903, the Tx mapping logic 802 passes the character to the parallel MUX circuit 810 for transmission through the serial communication channel 136. On the other hand, if the received character is an active control character, then in a fourth step 904, the Tx mapping logic 802 checks to see if mapping is enabled. If mapping is not enabled, then the Tx mapping logic 802 passes the received character to the parallel MUX circuit 810 for transmission through the serial communication channel 136, as in step 903. On the other hand, if mapping is enabled, then in fifth and sixth steps, 905 and 906, the Tx mapping logic 802 transmits the received character in Async-HDLC with transparency mapping protocol by first transmitting a control-escape character, hex 7D, then transmitting a modified version of the received character with its sixth bit TxD[5] inverted.

Figure 10:
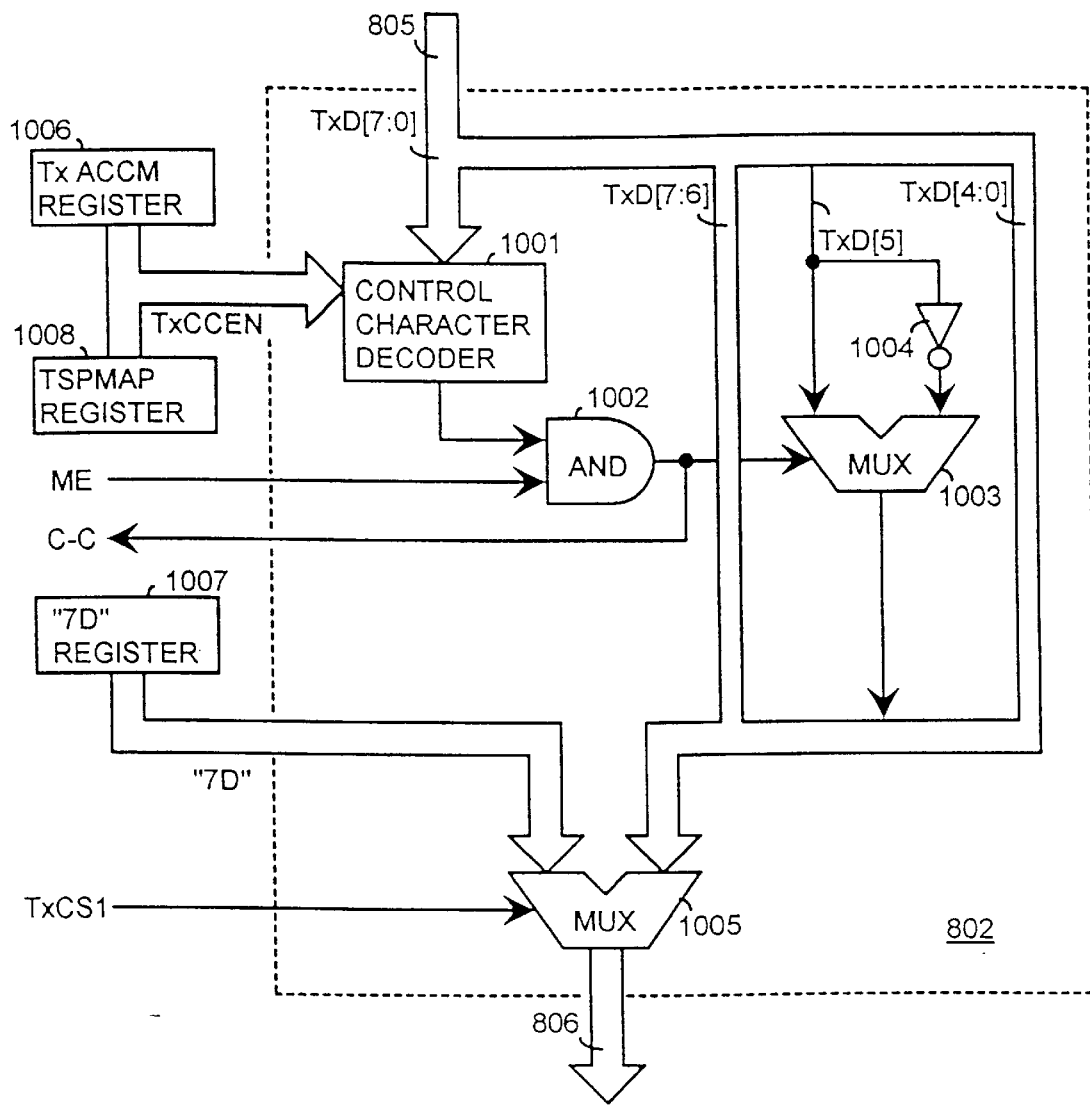
FIG. 10 illustrates, as an example, a block diagram of the transmitter mapping logic included in the transmitter circuit of FIG. 8, utilizing aspects of the present invention.

FIG. 10 illustrates, as an example, a block diagram of the Tx mapping logic 802. A character byte TxD[0:7] is received along bus 805 from the parallel MUX circuit 807. The entire character byte TxD[0:7] is provided to a control character decoder 1001. Bit six TxD[5] of the received character is provided to a first input of a MUX circuit 1003, and to an input of an inverter 1004 whose output is provided to a second input of the MUX circuit 1003. Bits one through five TxD[0:4], seven TxD[6], and eight TxD[7] are provided to a second set of inputs of a MUX circuit 1005, along with the output of the MUX circuit 1003 in the sixth bit location. Coupled to a first set of inputs of the MUX circuit 1005 is a register 1007 dedicated to storing the control-escape character, hex 7D.

Operation of the Tx mapping logic 802 is as follows. When the control character decoder 1001 receives a character matching an active control character, its output is placed in a HIGH logic state. Otherwise, its output is placed in a LOW logic state. The output of the control character decoder 1001 is provided to a first input of an AND gate 1002, and the map enable signal ME is provided to a second input of the AND gate 1002. The output of the AND gate 1002 is provided to the MUX circuit 1003 as a select signal so that when the select signal is in a LOW logic state, the MUX circuit 1003 passes bit six TxD[5] of the received character provided to its first input to the second set of inputs of the MUX circuit 1005, and when the select signal is in a HIGH logic state, the MUX circuit 1003 passes the inverted version of bit six TxD[5] provided to its second input by the inverter 1004 to the second set of inputs of the MUX circuit 1005. Consequently, when mapping is enabled (i.e., the map enable signal ME is in the HIGH logic state), and the control character decoder 1001 receives a character matching an active control character, the output of the AND gate 1002 goes to a HIGH logic state, activating a control character detection signal C—C, and causing the inverted version of bit six TxD[5] to be passed through the MUX circuit 1003. As a consequence, a version of the received character with its sixth bit TxD[5] inverted is provided to the second set of inputs of the MUX circuit 1005. The Tx control circuit 804 (or alternatively, the local processor 114 of the transmitting computer system 100) detects the activated detection signal C—C, and generates a select signal TxCS1 provided to the select input of the MUX circuit 1005 which causes the MUX circuit 1005 to first pass the control-escape character contents of the register 1007 through bus 806 to the first set of inputs of the parallel MUX circuit 810, then after the control-escape character has been passed by the parallel MUX circuit 810 to the P/S circuit 620, causes the MUX circuit 1005 to next pass the version of the received data character with its sixth bit TxD[5] inverted, to the first set of inputs of the parallel MUX circuit 810.

On the other hand, when mapping is not enabled (i.e., the map enable signal is in the LOW logic state), or when the control character decoder 1001 receives a character which does not match an active control character, the output of the AND gate 1002 goes to a LOW logic state, thereby not activating the detection signal C—C, which in turn, causes the non-inverted version of bit six TxD[5] to be passed through the MUX circuit 1003. As a consequence, a non-modified version of the received character is provided to the second set of inputs of the MUX circuit 1005. The Tx Control circuit 804 (or alternatively, the local processor 114 of the transmitting computer system 100) also responds to the non-activated state of the detection signal C—C, and generates the select signal TxCS1 provided to the select input of the MUX circuit 1005 such that the MUX circuit 1005 passes the non-modified version of the received character provided to its second set of inputs, to the first set of inputs of the parallel MUX circuit 810.

In another embodiment (not shown) of the Tx mapping logic 802, the MUX circuit 1005 and the "7D" register are eliminated. In this case, the Tx control circuit 804 (or alternatively, the local processor 114 of the transmitting computer system 100) performs the functions of the eliminated components by first storing the control-escape character, hex 7D, into the Tx C—C register 809, then generating appropriate select signals SEL6 to cause the parallel MUX circuit 810 to first pass the contents of the Tx C—C register 809 to the P/S circuit 620, then subsequently, pass the received character with its bit six TxD[5] inverted, as provided by the Tx mapping logic 802, to the P/S circuit 620. Generation of the modified version of the received character with its bit six TxD[5] inverted is performed by the Tx mapping logic 802 as previously described.

Figure 11:
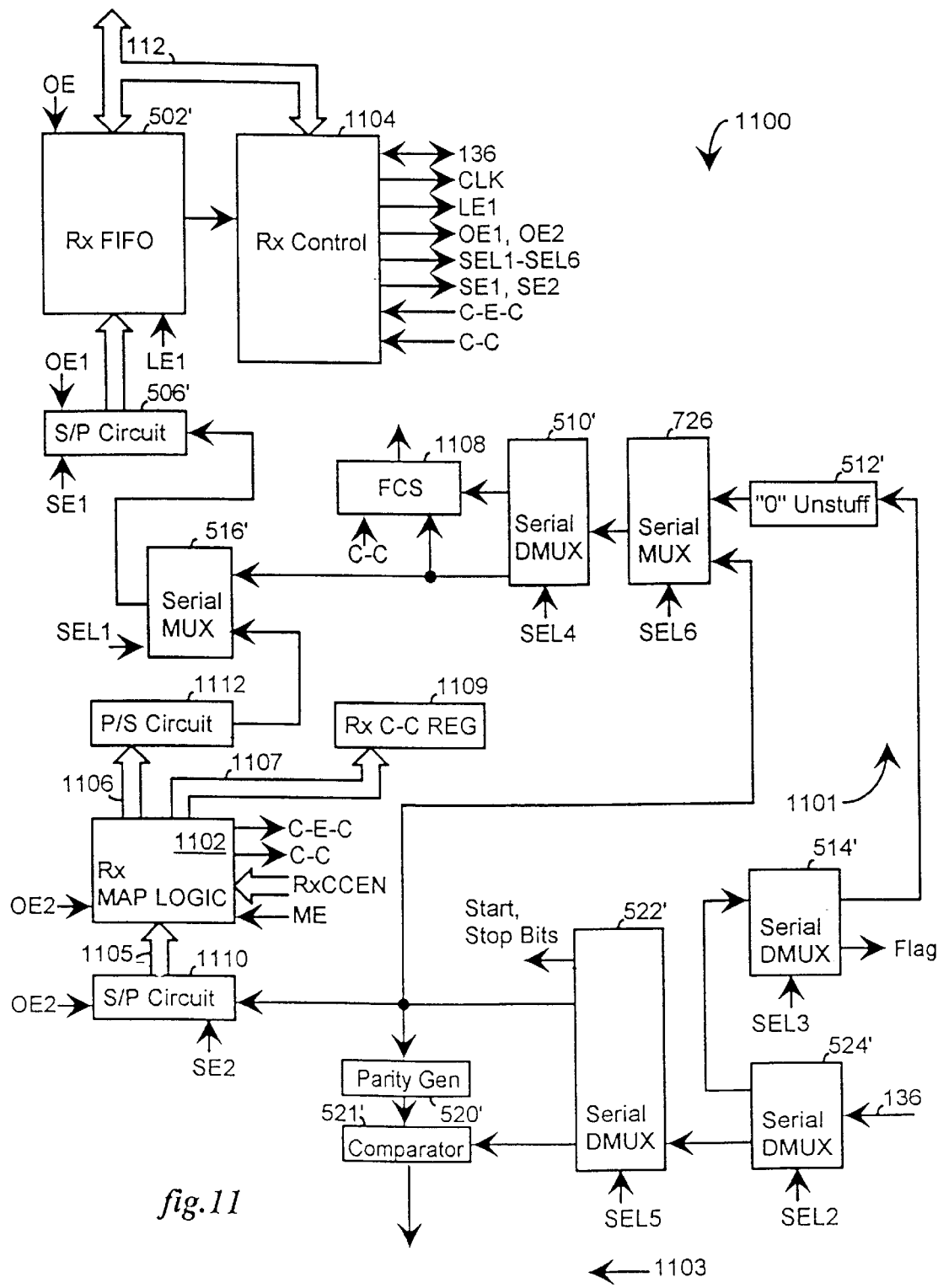
FIG. 11 illustrates, as an example, a block diagram of a receiver circuit including an asynchronous data path configured with transparency mapping logic suitable for receiving data in Async-HDLC, utilizing aspects of the present invention.

FIG. 11 illustrates, as an example, a block diagram of an alternative receiver circuit 1100 including an asynchronous data path 1103 configured with mapping logic 1102 suitable for receiving data in Async-HDLC with transparency mapping. Like the receiver circuit 700 of FIG. 7, the receiver circuit 1100 can also receive HDLC formatted frames of data of data selectively through either a first data path 1101 configured for receiving HDLC formatted frames of data, or a second data path 1103 configured for receiving Async-HDLC formatted bytes of data through the serial communication channel 136. Therefore, since many of the components of the two receiver circuits, 1100 and 700, are identical in construction and function, to simplify the following discussion, identical reference numbers are used in the figures to indicate identically functioning components.

A significant difference between the receiver circuits 1100 and 700 is that the receiver circuit 1100 performs certain transparency mapping functions primarily through hardware configured into its asynchronous data path 1103, whereas the receiver circuit 700 requires that such transparency mapping functions be performed primarily through software by a controlling processor. Accordingly, the receiver circuit 1100 is useful in that it frees up its respective controlling processor from having to perform such transparency mapping functions and therefore, allows more time for its processor to perform other important tasks.

To receive data in Async-HDLC with transparency mapping, the receiver circuit 1100 includes receiver (Rx) mapping logic 1102, which receives incoming characters from a serial-to-parallel (S/P) circuit 1110. The Rx mapping logic 1102 is enabled through a map enable signal ME provided, for example, by the Rx control circuit 1104 or the local processor 114 of the receiving computer system 100. Active ones of a set of control characters to be mapped are indicated by a plurality of control character enable signals RxCCEN deriving from, for example, a receiver (Rx) ACCM register. After processing each received character, the Rx mapping logic 1102 passes its output to either a parallel-to-serial (P/S) circuit 1112 to be included in the incoming data stream, or to a receiver (Rx) control character (C—C) register 1109 to be removed from the incoming data stream and made available for special processing by, for example, the Rx control circuit 1104 (or alternatively, the local processor 114 of the receiving computer system 100).

The set of control characters to be mapped are generally identical to those of the transmitter circuit 800. In particular, they include the same thirty-two (32) common control characters in the range hex 00 to hex 1F, the same four (4) user-defined characters beyond the hex 00 to 1F range, and the same, if any, other control characters which are always active. The active/inactive status of each of the 32 common control characters is stored in respective bits of the 32-bit Rx ACCM register, and the active/inactive status of each of the 4 user-defined characters is stored in respective bits of a 4-bit special map (RSPMAP) register, wherein both the Rx ACCM register and the RSPMAP register are preferably included in the Rx control circuit 1104 (or alternatively, in the local processor 114 or the local memory 116 of the receiving computer system 100).

Figure 12:
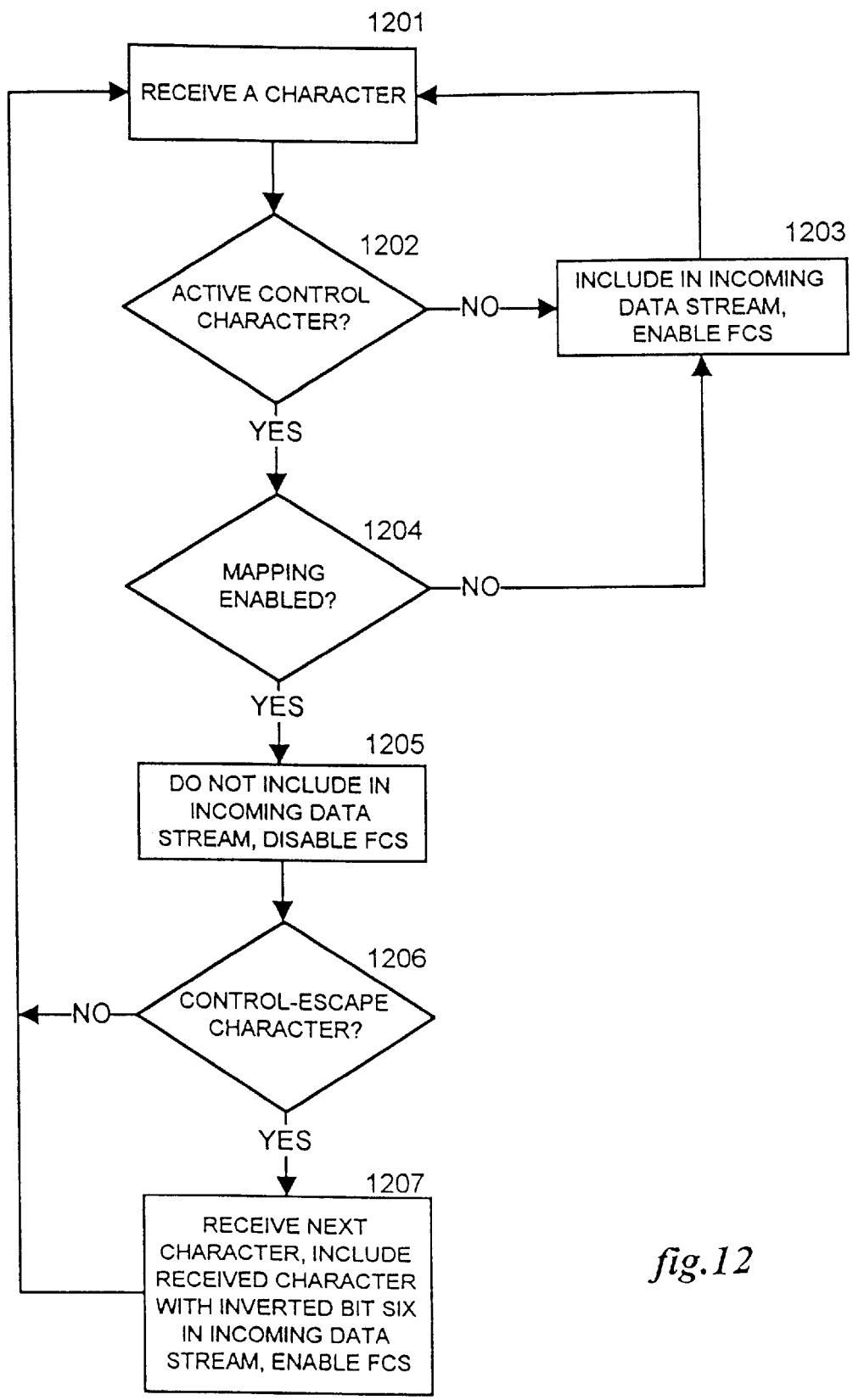
FIG. 12 illustrates, as an example, a flow diagram including certain steps of a method of receiving and reconstructing data transmitted in Async-HDLC with transparency mapping, utilizing aspects of the present invention.

FIG. 12 illustrates, as an example, a flow diagram including certain steps of a method of receiving data in Async-HDLC using transparency mapping, as performed by the Rx mapping logic 1102. In a first step 1201, the Rx mapping logic 1102 receives a character from the S/P circuit 1110. In a second step 1202, the Rx mapping logic 1102 determines whether or not the received character is an active control character. If the received character is not an active control character, then in a third step 1203, the Rx mapping logic 1102 passes the character to the P/S circuit 1112 to be included in the incoming data stream, and does not activate a control character detection signal C—C provided to an enable input of the FCS check circuit 1108 and as a consequence, causes the FCS check circuit 1108 to include the received character in its FCS calculation. On the other hand, if the received character is an active control character, then in a fourth step 1204, the Rx mapping logic 1102 checks to see if mapping is enabled. If mapping is not enabled, then the Rx mapping logic 1102 passes the received character to the P/S circuit 1112 to be included in the incoming data stream, as in step 1203. On the other hand, if mapping is enabled, then in a fifth step 1205, the Rx mapping logic 1102 passes the received character instead to the Rx control character (C—C) register 1109 to make it available for processing purposes to the Rx control circuit 1104 and/or the local processor 114 of the receiving control system 100, and as a consequence, effectively removing or not including the received character in the incoming data stream. At the same time, the Rx mapping logic 1102 activates the detection signal C—C, causing the FCS check circuit 1108 to be temporarily disabled, thereby not including the received character in its FCS calculation. In a sixth step 1206, the Rx mapping logic 1102 determines whether or not the received character is the control-escape character, hex 7D, which would indicate that the next or following character is to receive special processing. If the received character is not the control-escape character, then the processing of that character is completed and a next character is processed starting again with step 1201. On the other hand, if the received character is the control-escape character, then in a seventh step 1207, the Rx mapping logic 1102 receives the next character from the S/P circuit 1110, and conducts special processing on that next character by inverting its bit six RxD[5] (i.e., restoring the character to its original form before being modified for transmission in the Async-HDLC with transparency mapping protocol), by including the thus modified next character in the incoming data stream by passing the modified character to the P/S circuit 1112, and by deactivating the detection signal C—C so that the FCS check circuit 1108 is enabled and the modified character included in its FCS calculation. A next character is then processed starting again with step 1201.

Figure 13:
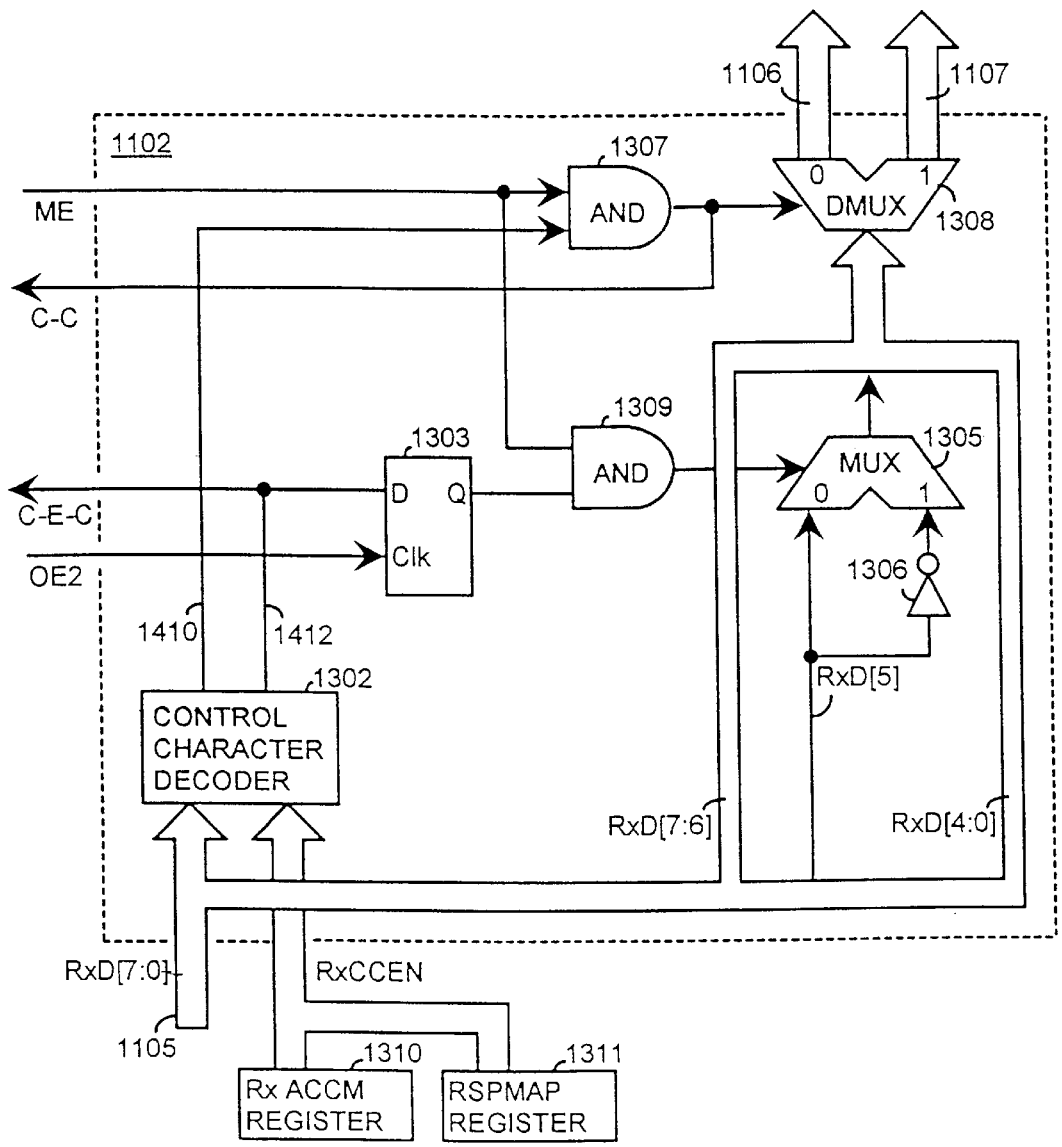
FIG. 13 illustrates, as an example, a block diagram of the receiver mapping logic included in the receiver circuit of FIG. 11, utilizing aspects of the present invention.

FIG. 13 illustrates, as an example, a block diagram of the Rx mapping logic 1102. A character byte RxD[0:7] is received along bus 1105 from the S/P circuit 1110. The entire character byte RxD[0:7] is provided to a control character decoder 1302. Bit six RxD[5] of the received character is provided to a first input of a MUX circuit 1305, and to an input of an inverter 1306 whose output is provided to a second input of the MUX circuit 1305. Bits one through five RxD[0:4], seven RxD[6], and eight RxD[7] are provided to a set of inputs of a DMUX circuit 1308, along with the output of the MUX circuit 1305 in the sixth bit location.

The control character decoder 1302 has two outputs. The first output provides a control character (C—C) detection signal 1410, and the second output provides a control-escape character (C-E-C) detection signal 1412. When the control character decoder 1302 receives a character matching an active control character, its C—C detection signal 1410 is placed in a HIGH logic state and if the received character further matches the control-escape character, hex 7D, its C-E-C detection signal 1412 is also placed in the HIGH logic state. Otherwise, they are placed in a LOW logic state. The C—C detection signal 1410 is provided to a first input of an AND gate 1307, and the map enable signal ME is provided to a second input of the AND gate 1307. The output of the AND gate 1307 is provided to the DMUX circuit 1308 as a select signal so that when the select signal is in a LOW logic state, the DMUX circuit 1308 passes the eight bits (i.e., character) provided at its set of inputs to the P/S circuit 1112 through the bus 1106 and consequently, including the character in the incoming data stream, and when the select signal is in a HIGH logic state, the DMUX circuit 1308 passes the eight bits provided at its set of inputs to a receiver (Rx) control character (C—C) register 1109 through the bus 1107 making the character available to the Rx control circuit 1104 and/or local processor 114 of the receiving computer system 100, and consequently, not including the character in the incoming data stream.

The C-E-C detection signal 1412 is provided to the D-input of a flip-flop 1303, which has as a clock input, the output enable signal OE2 provided to the S/P circuit 1110 by the Rx control circuit 1104 (or alternatively, by the local processor 114 of the receiving computer system 100). Accordingly, since activation of the output enable signal OE2 preceeds the decoding by the control character decoder 1302 of its corresponding character, the activated C-E-C detection signal 1412 is clocked through to the Q-output of the flip-flop 1303 only after initiation of a next character being received by the control character decoder 1302 from the S/P circuit 1110. The Q-output of the flip-flop 1303 is provided to a first input of AND gate 1309, and the map enable signal ME is provided to a second input of the AND gate 1309. The output of the AND gate 1309 is provided to the MUX circuit 1305 as a select signal so that when the select signal is in a LOW logic state, the MUX circuit 1305 passes bit six RxD[5] of the received character provided to its first input to the set of inputs of the DMUX circuit 1308, and when the select signal is in a HIGH logic state, the MUX circuit 1305 passes the inverted version of bit six RxD[5] provided to its second input by the inverter 1306 to the set of inputs of the DMUX circuit 1308. Consequently, when mapping is enabled (i.e., the map enable signal ME is in the HIGH logic state), and the control character decoder 1302 received a prior character matching the control-escape character, hex 7D, the output of the AND gate 1309 goes to a HIGH logic state, causing the inverted version of bit six RxD[5] of a next received character following the detected control-escape character, to be passed through the MUX circuit 1305. As a consequence, a version of the received character with its sixth bit RxD[5] inverted is provided to the set of inputs of the DMUX circuit 1308. Since the next character following the detected control-escape character cannot by definition be a control character, the C—C detection signal 1410 is not active for this next character. Therefore, the DMUX circuit 1308 includes the thus modified next character with its bit six RxD[5] inverted into the incoming data stream by passing it through the bus 1106 to the P/S circuit 1112, and the FCS circuit 1108 includes the thus modified next character with its bit six RxD[5] inverted in its FCS calculation. Further, since the next character following the detected control-escape character cannot by definition be a control-escape character, the C-E-C detection signal 1412 is also not active for this next character. Therefore, the output enable signal OE2 corresponding to a next character to be received, clocks the logic LOW through to the Q-output of the flip-flop 1303 and as a consequence, the MUX circuit 1305 passes the sixth bit RxD[5] of the next character to be received directly through to the set of inputs of the DMUX circuit 1308.

Figure 14:
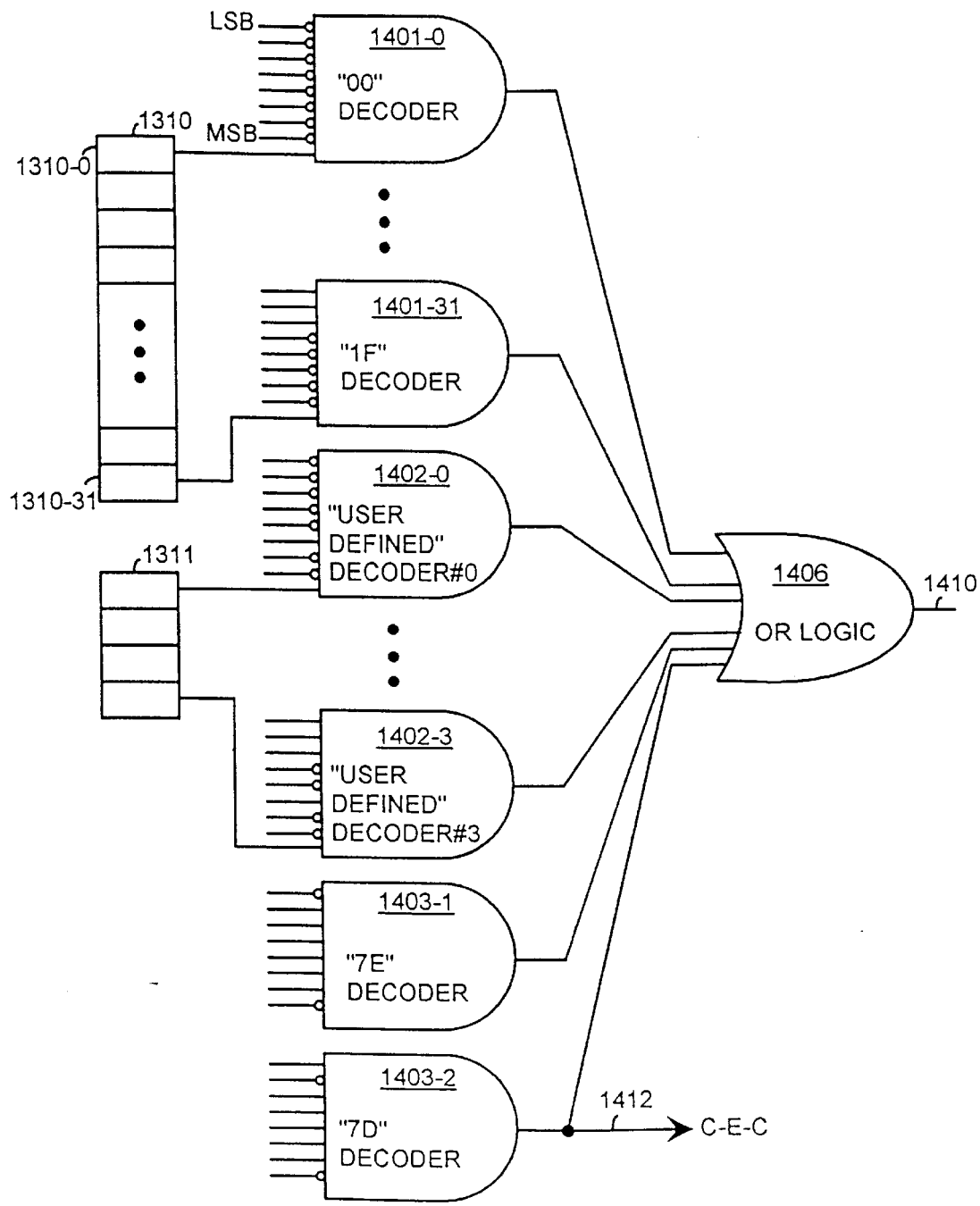
FIG. 14 illustrates, as an example, a logic diagram of the control character decoder logic included in the receiver mapping logic of FIG. 13, utilizing aspects of the present invention.

FIG. 14 illustrates, as an example, a logic diagram of the control character decoder 1302 of the Rx mapping logic 1102. A similarly constructed circuit is employed as the control character decoder 1001 of the Tx mapping logic 802. Included in the control character decoder 1302 are a plurality of decoder circuits, 1401-0 to 1401-31, 1402-0 to 1402-3, and 1403-1 and 1403-2, individually configured to decode a respective one of the mapped control characters. For example, each of the control characters in the hex range of 00 to 1F has a corresponding decoder circuit, 1401-0 to 1401-31, each of the user-defined control characters also has a corresponding decoder circuit, 1402-0 to 1402-3, and other control characters such as a flag byte, hex 7E, and the control-escape character, hex 7D, has a corresponding decoder circuit, 1403-1 and 1403-2. Each of the decoder circuits has eight inputs coupled to the bus 1105 to receive a character to be decoded, with the least-significant-bit (LSB) and most-significant-bit (MSB) of the character received as indicated in the figure for decoder circuit 1401-0. In addition, each of the decoder circuits, 1401-0 to 1401-31, has an additional input coupled to a corresponding bit of the Rx ACCM register 1310, and each of the decoder circuits, 1402-0 to 1402-3, has an additional input coupled to a corresponding bit of the RSPMAP register 1311. The decoders circuits, 1403-1 and 1403-2, do not have such an additional input, since they are always active.

The decoders circuits, 1401-0 to 1401-31, 1402-0 to 1402-3, and 11403-1 and 1403-2, are conventionally formed of AND gates with appropriate inverters before their respective inputs. For example, each of the character inputs of the decoder circuit 1401-0 has an inverter (conventionally appearing as a bubble) on it, so that the decoder circuit 1401-0 only generates an output which is in a HIGH logic state when each of its character inputs receives a LOW logic state input, and its active/inactive status input receives a HIGH logic state from bit 1310-0 of the Rx ACCM register 1310.

An OR gate circuit 1410 receives each of the outputs of the decoders circuits, 1401-0 to 1401-31, 1402-0 to 1402-3, and 11403-1 and 1403-2, to generate as its output, the C—C detection signal 1410. The C-E-C detection signal 1412, on the other hand, is taken directly from the output of the control-escape character decoder circuit 1403-2, as indicated in the figure. A flag detection signal may also be similarly taken directly, if desired, from the output of the flag character decoder circuit 1403-1.

Although the various aspects of the present invention have been described with respect to preferred embodiments, it will be understood that the invention is entitled to full protection within the full scope of the appended claims.

We claim:

1. A data path circuit for transmitting Async-HDLC data with transparency mapping, comprising:

means for receiving a character to be transmitted;

means for activating a detection signal if said received character is an active one of a set of control characters;

means for inverting a predetermined bit of said received character to generate a substitute character; and means for transmitting said received character if said detection signal is not activated, and transmitting said substitute character preceeded by a control-escape character if said detection signal is activated.

2. The data path circuit as recited in claim 1, wherein said detection signal activating means comprises:

a plurality of decoder circuits individually configured to detect a corresponding one of said set of control characters; and a transmit async control character map register having a plurality of bits individually coupled to an input of a corresponding one of said plurality of control character decoder circuits, and indicative of whether or not the corresponding one of said set of control characters is an active one.

3. The data path circuit as recited in claim 2, wherein said detection signal activating means further comprises a logical OR unit coupled to said plurality of decoder circuits such that an output of said logical OR unit activates said detection signal if said received character is an active one of said set of control characters.

4. The data path circuit as recited in claim 2, wherein said transmitting means comprises:

means for transmitting said received character if a map enable signal is not activated; and means for transmitting said substitute character preceeded by the control-escape character if said map enable signal and said detection signal are both activated.

5. The data path circuit as recited in claim 4 further comprising:

a storage circuit for storing a character to be transmitted by said data path circuit; and a field check sequence generator circuit coupled to said storage circuit for including said stored character in a field check sequence calculation;

wherein said receiving means includes means for receiving a character from said storage circuit if a first selection signal is in a first logic state, and a character of said field check sequence calculation if said first selection signal is in a second logic state.

6. The data path circuit as recited in claim 2, wherein said transmitting means comprises:

means for transmitting, if a second selection signal is indicative of a first logic state, said received character if a map enable signal is not activated, or said substitute character preceeded by the control-escape character if said map enable signal and said detection signal are both activated;

means for transmitting, if said second selection signal is indicative of a second logic state, a flag character; and means for transmitting, if said second selection signal is indicative of a third logic state, a control character.

7. A method of transmitting Async-HDLC data with transparency mapping, comprising the steps of:

receiving a character to be transmitted;

activating a detection signal if said received character is an active one of a set of control characters;

inverting a predetermined bit of said received character to generate a substitute character; and transmitting said received character if said detection signal is not activated, and transmitting said substitute character preceeded by a control-escape character if said detection signal is activated.

8. The method as recited in claim 7, wherein said detection signal activating step comprises the steps of:

providing said received character to a plurality of decoders individually configured to compare said received character against a respective one of said set of control characters; and activating said detection signal if one of said plurality of decoders compares and matches said received character against the respective one of said set of control characters corresponding to said one of said plurality of decoders.

9. The method as recited in claim 8, wherein said detection signal activating step further comprises the steps of:

generating a plurality of active/inactive state signals individually indicative of the active/inactive state of a respective one of said set of control characters;

providing said received character and individual ones of said plurality of active/inactive state signals to corresponding ones of said plurality of decoders; and activating said detection signal if one of said plurality of decoders compares and matches said received character against the respective one of said set of control characters corresponding to said one of said plurality of decoders, and the individual one of said plurality of active/inactive state signals provided to said one of said plurality of decoders is in an active state.

10. A computer system comprising:

a processor; and a data path circuit coupled to said processor through a data bus for transmitting Async-HDLC data with transparency mapping, and including means for receiving a character to be transmitted;

means for activating a detection signal if said received character is an active one of a set of control characters;

means for inverting a predetermined bit of said received character to generate a substitute character; and means for transmitting said received character if said detection signal is not activated, and transmitting said substitute character preceeded by a control-escape character if said detection signal is activated.

11. The computer system as recited in claim 10, wherein said detection signal activating means of said data path circuit comprises:

a plurality of decoder circuits individually configured to detect a corresponding one of said set of control characters; and a transmit async control character map register having a plurality of bits individually coupled to an input of a corresponding one of said plurality of control character decoder circuits, and indicative of whether or not the corresponding one of said set of control characters is an active one.

12. A data path circuit for receiving Async-HDLC data with transparency mapping, comprising:

means for receiving a character;

means for activating a detection signal if said received character is an active control character; and means for including said received character in an incoming data stream and enabling a check circuit to include said received character in an error checking calculation if said detection signal is not activated, and for not including said received character in said incoming data stream and disabling said check circuit to not include said received character in said error checking calculation if said detection signal is activated.

13. The data path circuit as recited in claim 12, further comprising:

means for checking whether said received character is a control-escape character indicating by predetermined convention that a next character to be received is to be specially conditioned before including said next character to be received in said incoming data stream; and means for specially conditioning said next character to be received and including said next character to be received in said incoming data stream.

14. The data path circuit as recited in claim 13, wherein said specially conditioning means includes means for inverting a predetermined bit of said next character to be received to generate a substitute character, and including said substitute character in said incoming data stream.

15. The data path as recited in claim 12, wherein said detection signal activating means comprises:

a plurality of decoder circuits individually configured to detect a corresponding one of said set of control characters; and a receive async control character map register having a plurality of bits individually coupled to an input of a corresponding one of said plurality of control character decoder circuits, and indicative of whether or not the corresponding one of said set of control characters is an active one.

16. The data path circuit as recited in claim 15, wherein said detection signal activating means further comprises a logical OR unit coupled to said plurality of decoder circuits such that an output of said logical OR unit activates said detection signal if said received character is an active one of said set of control characters.

17. The data path circuit as recited in claim 12, wherein said including means comprises:

means for including said received character in the incoming data stream and enabling the check circuit to include said received character in an error checking calculation if a map enable signal is not activated; and means for not including said received character in said incoming data stream and disabling said check circuit to not include said received character in said error checking calculation if said map enable signal and said detection signal are both activated.

18. A method of receiving Async-HDLC data with transparency mapping, comprising the steps of:

receiving a character;

activating a detection signal if said received character is an active control character; and including said received character in an incoming data stream and enabling a check circuit to include said received character in an error checking calculation if said detection signal is not activated, and not including said received character in said incoming data stream and disabling said check circuit to not include said received character in said error checking calculation if said detection signal is activated.

19. The method as recited in claim 18, further comprising, after said receiving step, the steps of:

checking whether said received character is a control-escape character indicating by predetermined convention that a next character to be received is to be specially conditioned before including said next character to be received in said incoming data stream; and specially conditioning said next character and including said specially conditioned next character in said incoming data stream if the previously received character was the control-escape character.

20. The method as recited in claim 19, wherein said specially conditioning step comprises the step of inverting a predetermined bit of said next character to generate a substitute character, and including said substitute character in said incoming data stream if the previously received character was the control-escape character.

21. A computer system comprising:

a processor; and a data path circuit coupled to said processor through a data bus for receiving Async-HDLC data with transparency mapping, and including means for receiving a character;

means for activating a detection signal if said received character is an active control character; and means for including said received character in an incoming data stream and enabling a check circuit to include said received character in an error checking calculation if said detection signal is not activated, and for not including said received character in said incoming data stream and disabling said check circuit to not include said received character in said error checking calculation if said detection signal is activated.

22. The computer system as recited in claim 21, wherein said data path circuit further comprises:

means for checking whether said received character is a control-escape character indicating by predetermined convention that a next character to be received is to be specially conditioned before including said next character to be received in said incoming data stream; and means for specially conditioning said next character to be received and including said next character to be received in said incoming data stream.

23. The computer system as recited in claim 22, wherein said detection signal activating means of said data path circuit comprises:

a plurality of decoder circuits individually configured to detect a corresponding one of said set of control characters; and a receive async control character map register having a plurality of bits individually coupled to an input of a corresponding one of said plurality of control character decoder circuits, and indicative of whether or not the corresponding one of said set of control characters is an active one.

* * * * *

UNITED STATES PATENT AND TRADEMARK OFFICE
CERTIFICATE OF CORRECTION

PATENT NO : 5,809,341
DATED : September 15, 1998
INVENTOR(S) : Hanumanthrao V. Nimishakavi et al.

It is certified that error appears in the above-identified patent and that said Letters Patent is hereby corrected as shown below:

On title page, item 1 Inventor Name
replace "Nimishakvi"
with --Nimishakavi--.

Signed and Sealed this

Twenty-ninth Day of December, 1998

Attest:

*Attesting Officer*

BRUCE LEHMAN
*Commissioner of Patents and Trademarks*